United States Patent
Yan et al.

(10) Patent No.: US 12,339,943 B2
(45) Date of Patent: Jun. 24, 2025

(54) VERIFIABILITY FOR EXECUTION IN TRUSTED EXECUTION ENVIRONMENT

(71) Applicant: Nokia Technologies Oy, Espoo (FI)

(72) Inventors: Zheng Yan, Espoo (FI); Wei Sun, Xi'an (CN); Wenxiu Ding, Xi'an (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 478 days.

(21) Appl. No.: 17/635,897

(22) PCT Filed: Aug. 19, 2019

(86) PCT No.: PCT/CN2019/101427
§ 371 (c)(1),
(2) Date: Feb. 16, 2022

(87) PCT Pub. No.: WO2021/031084
PCT Pub. Date: Feb. 25, 2021

(65) Prior Publication Data
US 2022/0292174 A1    Sep. 15, 2022

(51) Int. Cl.
*G06F 21/33* (2013.01)
*G06F 21/53* (2013.01)

(52) U.S. Cl.
CPC .............. *G06F 21/33* (2013.01); *G06F 21/53* (2013.01); *G06F 2221/031* (2013.01)

(58) Field of Classification Search
CPC ....... H04L 9/50; H04L 9/3239; H04L 9/3236; H04L 9/3218; H04L 9/3234;
(Continued)

(56) References Cited

U.S. PATENT DOCUMENTS 8,285,999 B1* 10/2012 Ghose ................ H04L 9/3271
713/180
2014/0082329 A1* 3/2014 Ghose ................ G06F 9/3877
712/208
(Continued)

FOREIGN PATENT DOCUMENTS

CN    103795717 A    5/2014
CN    107409118 A    11/2017
(Continued)

OTHER PUBLICATIONS

Yu et al., "A Survey of Verifiable Computation", Mobile Networks and Applications, vol. 22, No. 3, May 6, 2017, 16 pages.
(Continued)

*Primary Examiner* — Tae K Kim
(74) *Attorney, Agent, or Firm* — Lippes Mathias LLP

(57) ABSTRACT

Example embodiments of the present disclosure relate to verifiability for execution in a trusted execution environment (TEE). According to a method, a request for execution of a task is transmitted by a first apparatus and to a second apparatus, the task comprising a plurality of functions to be executed. A first validation key is generated from identification information of the plurality of functions based on an expected execution plan in at least one trusted execution environment of the second apparatus. An execution result for the task and a second validation key are received from the second apparatus. Correctness of the execution result is determined by comparing the first validation key with the second validation key. Through the solution, it is possible to provide the verifiability of the correctness of the execution result returned by the remote apparatus and achieves high performance on security, trust, and privacy.

18 Claims, 11 Drawing Sheets

(58) Field of Classification Search
CPC . H04L 63/123; H04L 63/12; H04L 2209/127; H04L 9/32; H04L 9/3221; G06F 21/64; G06F 21/602; G06F 21/53; G06F 21/54; G06F 21/52; G06F 21/50

See application file for complete search history.

(56) References Cited

U.S. PATENT DOCUMENTS

| | | | | |
|---|---|---|---|---|
| 2016/0248589 | A1* | 8/2016 | Potlapally | H04L 9/3234 |
| 2018/0204005 | A1* | 7/2018 | Gajek | H04L 9/3218 |
| 2020/0136797 | A1* | 4/2020 | Yu | H04L 9/008 |
| 2020/0201910 | A1* | 6/2020 | Gavaudan | G06Q 20/32 |
| 2021/0328798 | A1* | 10/2021 | Liu | H04L 61/4517 |
| 2021/0397676 | A1* | 12/2021 | Fu | H04L 9/3093 |

FOREIGN PATENT DOCUMENTS

| | | |
|---|---|---|
| CN | 109150811 A | 1/2019 |
| CN | 109889498 A | 6/2019 |
| EP | 3499847 A1 | 6/2019 |
| WO | 2018/078406 A1 | 5/2018 |
| WO | 2019/016549 A1 | 1/2019 |
| WO | 2019/120317 A2 | 6/2019 |

OTHER PUBLICATIONS

Extended European Search Report received for corresponding European Patent Application No. 19942311.2, dated Mar. 28, 2023, 5 pages.

Cafaro et al., "Space-efficient Verifiable Secret Sharing Using Polynomial Interpolation", IEEE Transactions on Cloud Computing, vol. 6, No. 2, Apr.-Jun. 1, 2018, pp. 453-463.

Ma et al., "Verifiable and Exculpable Outsourced Attribute-Based Encryption for Access Control in Cloud Computing", IEEE Transactions on Dependable and Secure Computing, vol. 14, No. 6, Nov.-Dec. 1, 2017, 679-692.

Renjith et al., "Verifiable El-gamal re-encryption with authenticity in cloud", Fourth International Conference on Computing, Communications and Networking Technologies (ICCCNT), Jul. 4-6, 2013, 5 pages.

Sun et al., "Verifiable Privacy-Preserving Multi-Keyword Text Search in the Cloud Supporting Similarity-Based Ranking", IEEE Transactions on Parallel and Distributed Systems, vol. 25, No. 11, Nov. 2014, pp. 3025-3035.

Wang et al., "Verifiable Auditing for Outsourced Database in Cloud Computing", IEEE Transactions on Computers, vol. 64, No. 11, Nov. 1, 2015, pp. 3293-3303.

Wen et al., "A Verifiable Data Deduplication Scheme in Cloud Computing", International Conference on Intelligent Networking and Collaborative Systems, Sep. 10-12, 2014, pp. 85-88.

Xu et al., "Circuit Ciphertext-Policy Attribute-Based Hybrid Encryption with Verifiable Delegation in Cloud Computing", IEEE Transactions on Parallel and Distributed Systems, vol. 27, No. 1, Jan. 1, 2016, pp. 119-129.

Yadav et al., "Secure data storage operations with verifiable outsourced decryption for mobile cloud computing", International Conference on Recent Advances and Innovations in Engineering, May 9-11, 2014, 5 pages.

Guo et al., "Verifiable privacy-preserving monitoring for cloud-assisted mHealth systems", IEEE Conference on Computer Communications (INFOCOM), Apr. 26-May 1, 2015, pp. 1026-1034.

Catalano et al., "Practical homomorphic macs for arithmetic circuits", Annual International Conference on the Theory and Applications of Cryptographic Techniques, 2013, pp. 336-352.

Yan et al., "Context-aware verifiable cloud computing", IEEE Access, vol. 5, Feb. 9, 2017, pp. 2211-2227.

Santos et al., "Toward Coercion-Resistant End-to-End Verifiable Electronic Voting Systems", 12th IEEE International Conference on Trust, Security and Privacy in Computing and Communications, Jul. 16-18, 2013, pp. 1696-1703.

Park et al., "Themis: A Mutually Verifiable Billing System for the Cloud Computing Environment", IEEE Transactions on Services Computing, vol. 6, No. 3, Jul.-Sep. 2013, pp. 300-313.

Liu et al., "Publicly Verifiable Inner Product Evaluation over Outsourced Data Streams under Multiple Keys", IEEE Transactions on Services Computing, vol. 10, No. 5, Sep.-Oct. 1, 2017, pp. 826-838.

Li et al., "TMACS: A Robust and Verifiable Threshold Multi-Authority Access Control System in Public Cloud Storage", IEEE Transactions on Parallel and Distributed Systems, vol. 27, No. 5, May 1, 2016, pp. 1484-1496.

Schiffman et al., "Cloud Verifier: Verifiable Auditing Service for IaaS Clouds", IEEE Ninth World Congress on Services, Jun. 28-Jul. 3, 2013, pp. 239-246.

Duarte et al., "Leveraging ARM TrustZone and Verifiable Computing to Provide Auditable Mobile Functions", Proceedings of the 15th EAI International Conference on Mobile and Ubiquitous Systems: Computing, Networking and Services, Nov. 2018, pp. 302-311.

Backes et al., "Verifiable delegation of computation on outsourced data", Proceedings of the 2013 ACM SIGSAC conference on Computer & communications security, Nov. 2013, pp. 863-874.

Benabbas et al., "Verifiable delegation of computation over large datasets", Advances in Cryptology, 2011, 20 pages.

Chung et al., "Improved delegation of computation using fully homomorphic encryption", Annual Cryptology Conference, 2010, pp. 483-501.

Fiore et al., "Publicly verifiable delegation of large polynomials and matrix computations, with applications", Proceedings of the 2012 ACM conference on Computer and communications security, Oct. 2012, pp. 501-512.

Hohenberger et al., "How to securely outsource cryptographic computations", Theory of Cryptography Conference, 2005, pp. 264-282.

Lai et al., "Verifiable computation on outsourced encrypted data", European Symposium on Research in Computer Security, 2014, pp. 273-291.

Parno et al., "How to delegate and verify in public: Verifiable computation from attribute-based encryption", Theory of Cryptography Conference, 2012, pp. 422-439.

Dijk et al., "Speeding up Exponentiation using an Untrusted Computational Resource", Designs, Codes and Cryptography, 2006, vol. 39, pp. 253-273.

Gennaro et al., "Fully homomorphic message authenticators", International Conference on the Theory and Application of Cryptology and Information Security, 2013, pp. 301-320.

Boneh et al., "Homomorphic signatures for polynomial functions", Advances in Cryptology, 2011, pp. 149-168.

Thaler, "Practical verified computation with streaming interactive proofs", Dissertation, May 2013, 288 pages.

Kate et al., "Constant-size commitments to polynomials and their applications", International Conference on the Theory and Application of Cryptology and Information Security, 2010, pp. 177-194.

Setty et al., "Making argument systems for outsourced computation practical (sometimes)", Network & Distributed System Security Symposium (NDSS), Feb. 2012, 20 pages.

Setty et al., "Taking proof-based verified computation a few steps closer to practicality", 21st USENIX Security Symposium, 2012, pp. 1-16.

Sasson et al., "SNARKs for C: Verifying Program Executions Succinctly and in Zero Knowledge", Advances in Cryptology, 2013, pp. 90-108.

Anati et al., "Innovative Technology for CPU Based Attestation and Sealing", Proceedings of the 2nd international workshop on hardware and architectural support for security and privacy, vol. 13, No. 7, 2013, pp. 1-7.

Schuster et al., "VC3: Trustworthy Data Analytics in the Cloud Using SGX", IEEE Symposium on Security and Privacy, May 17-21, 2015, pp. 38-54.

Dean et al., "Mapreduce: Simplified data processing on large clusters", Communications of the ACM, vol. 51, No. 1 Jan. 2008, pp. 107-113.

(56) References Cited

OTHER PUBLICATIONS

Low, "Hardware Security: Intel SGX and VC3", EECS Instructional & Electronics Support, Sep. 2018, pp. 1-8.
Subramanyan et al., "A Formal Foundation for Secure Remote Execution of Enclaves", Proceedings of the 2017 ACM SIGSAC Conference on Computer and Communications Security, 2017, pp. 1-16.
"Intro to SGX: From HTTP to Enclaves", Medium, Retrieved on Feb. 25, 2022, Webpage available at : https://medium.com/corda/intro-to-sgx-from-http-to-enclaves-1bf38a3bf595.
Tang et al., "Authenticated Key-value Stores with Hardware Enclaves", arXiv, Apr. 26, 2019, 16 pages.
Alder et al., "Migrating SGX Enclaves with Persistent State", arXiv, Mar. 29, 2018, 13 pages.
International Search Report and Written Opinion received for corresponding Patent Cooperation Treaty Application No. PCT/CN2019/101427, dated Apr. 24, 2020, 9 pages.
Notice of Allowance received for corresponding European Patent Application No. 19942311.2, dated Oct. 16, 2023, 8 pages.
Office action received for corresponding Chinese Patent Application No. 201980099545.3, dated Apr. 22, 2023, 6 pages of office action and no page of Translation available.

\* cited by examiner

VERIFIABILITY FOR EXECUTION IN TRUSTED EXECUTION ENVIRONMENT

FIELD

Embodiments of the present disclosure generally relate to the field of computer technology and in particular, to a method, device, apparatus and computer readable storage medium for verifiability for execution in a trusted execution environment (TEE).

BACKGROUND

Remote computing services, such as cloud computing services, provide off-site opportunities for individuals and corporations. An example of a cloud service is a cloud processing service where a user is given access to processor resources at a computer or computing platform for data processing. This may be useful, for example where a computation-weak device needs access to high-capacity computation intermittently, and obtaining actual high-capacity computing hardware would be wasteful as the hardware would mostly be unused since the need is only intermittent.

While useful, there are some security and privacy issues when the data are outsourced and being handed over in the cloud platform. One crucial problem in cloud computing is the processed results provided by the cloud platform could be incorrect. An approach to address this problem is verifiable computation. Verifiable computation is to check the integrity and confidentiality of the computation in the remote computing platform.

SUMMARY

In general, example embodiments of the present disclosure provide a solution for verifiability for execution in a TEE.

In a first aspect, there is provided a first apparatus. The first apparatus comprises at least one processor; and at least one memory including computer program code; where the at least one memory and the computer program code are configured to, with the at least one processor, cause the first apparatus to: transmit, to a second apparatus, a request for execution of a task, the task comprising a plurality of functions to be executed; generate a first validation key from identification information of the plurality of functions based on an expected execution plan in at least one trusted execution environment of the second apparatus; receive, from the second apparatus, an execution result for the task and a second validation key; and determine correctness of the execution result by comparing the first validation key with the second validation key.

In a second aspect, there is provided a second apparatus. The second apparatus comprises at least one processor; and at least one memory including computer program code; where the at least one memory and the computer program code are configured to, with the at least one processor, cause the second apparatus to: receive, from a first apparatus, a request for execution of a task, the task comprising a plurality of functions to be executed; execute, based on an execution plan, the plurality of functions in at least one trusted execution environment to obtain an execution result for the task; generate a second validation key from identification information of the plurality of functions based on the execution plan; and transmit, to the first apparatus, the execution result and the second validation key for validating correctness of the execution result.

In a third aspect, there is provided a method. The method comprises transmitting, by a first apparatus and to a second apparatus, a request for execution of a task, the task comprising a plurality of functions to be executed; generating a first validation key from identification information of the plurality of functions based on an expected execution plan in at least one trusted execution environment of the second apparatus; receiving, from the second apparatus, an execution result for the task and a second validation key; and determining correctness of the execution result by comparing the first validation key with the second validation key.

In a fourth aspect, there is provided a method. The method comprises receiving, from a first apparatus and by a second apparatus, a request for execution of a task, the task comprising a plurality of functions to be executed; executing, based on an execution plan, the plurality of functions in at least one trusted execution environment to obtain an execution result for the task; generating a second validation key from identification information of the plurality of functions based on the execution plan; and transmitting, to the first apparatus, the execution result and the second validation key for validating correctness of the execution result.

In a fifth aspect, there is provided a first apparatus. The first apparatus comprises means for transmitting, to a second apparatus, a request for execution of a task, the task comprising a plurality of functions to be executed; means for generating a first validation key from identification information of the plurality of functions based on an expected execution plan in at least one trusted execution environment of the second apparatus; means for receiving, from the second apparatus, an execution result for the task and a second validation key; and means for determining correctness of the execution result by comparing the first validation key with the second validation key.

In a sixth aspect, there is provided a second apparatus. The second apparatus comprises means for receiving, from a first apparatus, a request for execution of a task, the task comprising a plurality of functions to be executed; means for executing, based on an execution plan, the plurality of functions in at least one trusted execution environment to obtain an execution result for the task; means for generating a second validation key from identification information of the plurality of functions based on the execution plan; and means for transmitting, to the first apparatus, the execution result and the second validation key for validating correctness of the execution result.

In a seventh aspect, there is provided a non-transitory computer readable medium comprising program instructions for causing a first apparatus to transmit, to a second apparatus, a request for execution of a task, the task comprising a plurality of functions to be executed; generate a first validation key from identification information of the plurality of functions based on an expected execution plan in at least one trusted execution environment of the second apparatus; receive, from the second apparatus, an execution result for the task and a second validation key; and determine correctness of the execution result by comparing the first validation key with the second validation key.

In an eighth aspect, there is provided a non-transitory computer readable medium comprising program instructions for causing a second apparatus to receive, from a first apparatus, a request for execution of a task, the task comprising a plurality of functions to be executed; execute, based on an execution plan, the plurality of functions in at least one trusted execution environment to obtain an execution result for the task; generate a second validation key from identification information of the plurality of functions based on the execution plan; and transmit, to the first apparatus, the execution result and the second validation key for validating correctness of the execution result.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
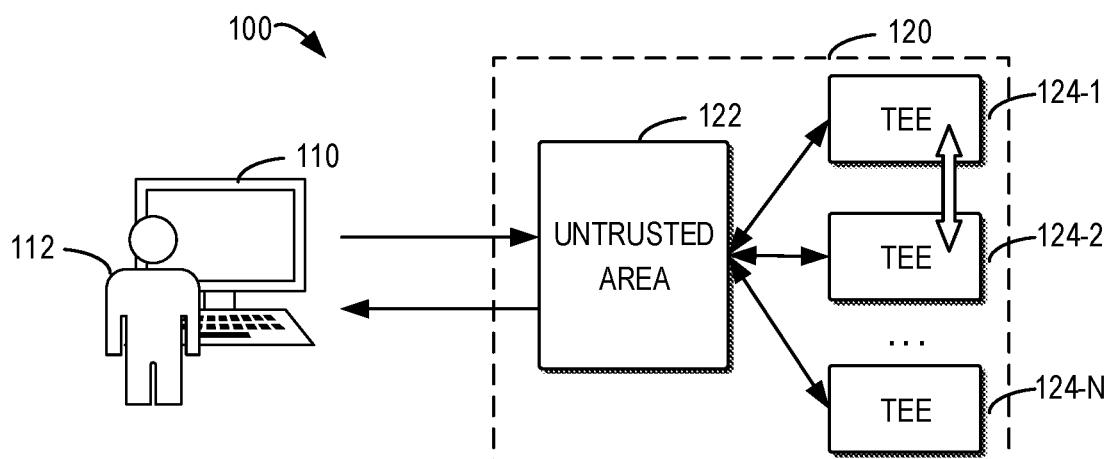
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "cloud computing" refers to a networking-based computing environment where shared computing resources, software and information are provided to computing nodes and other devices on-demand, like a public utility. The computing resources are dynamically scalable and accessible via a network, such as the Internet.

The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively. The cloud computing can provide various cloud services including batch computing services, stream computing services, data processing and computation services, and database services.

As used herein, the term "service" is a broad and generic nomenclature intended to encompass any capability of logically functioning constructs (such as applications, executables, operating systems or the like) to facilitate delivering content/data, performing functions or otherwise assisting another device, application or service. Typical service providers design and provision their services using computing resources consumed from a public or private computing environment. As some examples, a service can be any type of network function service, web service, identity management service, firewall or other security service, messaging service, data storage or backup service, file maintenance service, or any other service that can be made available to users of the computing environment. It should be appreciated that other services associated with or otherwise supported by a computing environment are envisioned.

The term "cloud-based service" or, more simply, "cloud services" refers not only to services provided in a cloud computing environment, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Example Environment

As mentioned above, computation in a remote platform such as a cloud computing platform may incur some security and privacy issues. An approach to alleviate those issues is to use a trusted execution environment (TEE) provided by a trusted computing platform (TCP).

FIG. 1 illustrates an example environment 100 in which example embodiments of the present disclosure may be implemented. The environment 100 is based on a TCP. As shown, a user 112 may request, via a first apparatus 110, execution of a task to be performed at a remote second apparatus 120.

The first apparatus 110 may include or be implemented as client computer or computing system. The term "client computer" or "client computing system" refers to any computer, user equipment (UE), embedded device, mobile device, or other system that can be used to perform the functionality described as being performed by the client computer. The first apparatus 110 any type of mobile terminal, fixed terminal, or portable terminal including a desktop computer, laptop computer, notebook computer, netbook computer, tablet computer, personal communication system (PCS) device, personal navigation device, personal digital assistants (PDAs), or any combination thereof, including the accessories and peripherals of these devices, or any combination thereof, it is also contemplated that the first apparatus 110 can support any type of interface to the user (such as "wearable" circuitry, etc.).

The second apparatus 120 may include or be implemented as a computing device/apparatus/node/machine, a cluster of computing devices/apparatuses/nodes/machines, a computing system, or a computing platform. Examples of the second apparatus 120 may include any general-purpose computer, computing nodes, server, mainframe, workstations, or any other computing machine. The second apparatus 120 may be included as at least a part of a computing environment, to provide data processing, storage, networking, and/or any other functions to the first apparatus 110. In some example embodiments, the second apparatus 120 may form at least a part of a cloud computing environment.

The second apparatus 120 implements a TCP which is divided into an untrusted area 122 and a trusted area including one or more TEEs 124-1, 124-2, . . . , 124-N (where N is an integer larger than or equal to one) to provide various services, applications, functions, and so on. For ease of discussion, the TEEs 124-1, 124-2, . . . , 124-N are collectively or individually referred to as TEEs 124 hereinafter. A TEE 124 provides a mechanism by which the user-trusted code running within the protected memory area certifies to the client computer that it is running within a secure execution environment.

In some implementations, the second apparatus 120 may include one or more security-enabled processors which can protect the integrity and confidentiality of the computation inside a TEE 124 by isolating the code and data from privileged software and hardware in the outside environment, including the operating system and hypervisor. Thus, once a TEE 124 is initiated, privileged code and the rest of the untrusted area 122 cannot directly read data that resides in the protected environment, or change the behavior of the code within the TEE 124 without detection. Various different TEEs may be jointly or alternatively be used. Some examples of a TEE 124 may include the emerging Software Guard Extension (SGX) provided by Intel Corporation of Santa Clara, California, the TrustZone of the Advanced RISC Machines (ARM) architecture, the Trusted Platform Module (TPM) technology, or any other security execution technologies.

During operation, the security-enabled processor(s) of the second apparatus 120 may perform an attestation protocol. At a setup stage, the first apparatus 110 may issue a remote attestation with the second apparatus 120 to negotiate a session key for encrypting following communications between the first and second apparatus 120 and 120. The first apparatus 110 may then submit a request for executing a task. Data of the task is transmitted to the second apparatus 120 through a security channel based on the session key. The communication between the first and second apparatuses 110 and 120 may through a wired or wireless network.

The second apparatus 120 creates one or more TEEs 124 for execution of the request. Generally, the untrusted area 122 directly communicates with the first apparatus 110. In addition, the untrusted area 122 may also be responsible for creation, recall/invoking of TEEs 124, and may even control the operations distributed across different TEEs 124 and thus may control the order in which the functions are invoked in the TEEs 124. The execution results in the TEEs 124 may be provided to the untrusted area 122 to transmit to the first apparatus 110. In some security-based implementations, the data (such as the execution result) provided from an individual TEE 124 to the untrusted area 122 is signed with a signature for the TEE 124. This signature may characterize the content and the layout of the TEE 124 at the time when the TEE 124 is created and will not be modified during runtime.

In some cases, data can to be exchanged between TEEs 124. For example, when two or more TEEs 124 work together to accomplish a task, an intermediate result of a TEE 124 can be transitioned to another TEE 124. In those cases, a local attestation occurs to authenticate two separates TEEs 124. Each TEE 124 can verify the other TEE 124 in order to confirm that they are both trustworthy. Once the local attestation is done, the two TEEs 124 can establish a protected session by sharing a session key to encrypt the exchanged information therebetween.

It is to be understood that although this disclosure includes description on cloud computing, implementation of the teachings recited herein are not limited to a cloud computing environment. Rather, example embodiments of the present invention are capable of being implemented in conjunction with any other type of computing environment now known or later developed.

It is noted that TCP and TEE are well understood by those skilled in the art. The use of the terms TCP and TEE, however, are not intended to limit aspects of the present disclosure solely to devices or components that comply with one or more versions of standards for implementing TCPs and TEEs. Instead, these terms are used as examples of a security platform and components that may be used in accordance with aspects of the subject matter described herein. In some cases, a TEE may be referred to as an "enclave."

Regardless of the security properties provided by TEEs, there are still some drawbacks in using TEEs to achieve secure and private-preserving computation with verifiability. Thus, verifiable computation can be applied to facilitate verification execution results provided by the remote TCP is trusted or not.

Working Principle and Example Signaling Interactions

According to some example embodiments of the present disclosure, there is provided a solution for verifiable computation. In this solution, in the case of a first apparatus requesting a second apparatus to execute a task, the first apparatus generates a first validation key from identification information of various functions of the task based on an expected execution plan for those functions in one or more TEEs of the second apparatus. A second validation key is also generated by the second apparatus from the same identification information based on an actual execution plan for those functions in the TEE(s). The second apparatus provides an execution result of the task and the second validation key to the first apparatus. The first apparatus can thus determine correctness of the execution result by comparing the generated first validation key and the received first validation key. In this way, it is possible to provide the verifiability of the correctness of the execution result returned by the remote apparatus and achieves high performance on security, trust, and privacy. This solution can provide high generality and can be suitable for any type of task processing, operations, and computations.

Figure 2:
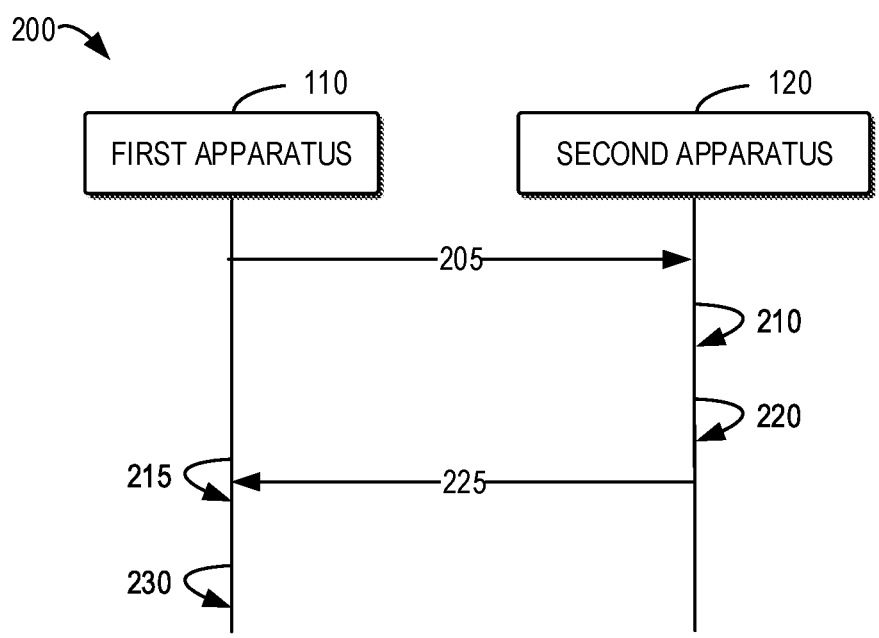
FIG. 2 illustrates a signaling chart illustrating a process for verifiable computation according to some example embodiments of the present disclosure.

Principle and example embodiments of the present disclosure will be described in detail below with reference to the accompanying drawings. Reference is now made to FIG. 2, which shows a signaling chart of a process 200 for verifiable computation according to some example embodiments of the present disclosure. For purpose of discussion, the process 200 will be described with reference to FIG. 1. The process 200 may involve the first apparatus 110 and the second apparatus 120.

The first apparatus 110 transmits 205 a request for execution of a task to the second apparatus 120. To ensure secure transmission, the first and second apparatus 120 and 120 may negotiate with each other, for example, through a remote attestation process, to share a session key for encrypting information exchanged therebetween. The request for execution of the task may thus be transmitted to the second apparatus 120 using the session key. In some cases, the first apparatus 110 may also provide input data for the task. The input data may also be encrypted using the session key and sent to the second apparatus 120 together with the encrypted request. The encrypted request and input data form a cipher text. In some other examples, instead of directly transmitting data, the first apparatus 110 may indicate a storage location of the input data to the second apparatus 120 such that the second apparatus 120 may obtain the input data from the storage location for execution of the task. In this case, the storage location may then be encrypted and sent together with the request.

The task to be executed may be any type of task the first apparatus 110 delegates the second apparatus 120 to execute. Examples of the task include, but are not limited to, data processing, batch computing, stream computing, data storage, and so on. Typically, the accomplishment of the task includes execution of a plurality of functions. The user 112 of the first apparatus 110 may choose or define the functions of the task according to his/her demand. In some examples, those functions may be provided in a computing environment as public for the user 112 to choose. The functions may also be customized or designed by the user 112.

Upon receiving the request from the first apparatus 110, the second apparatus 120 may decrypt the request and possibly the input data of the task using the session key. The second apparatus 120 then executes 210 the plurality of functions of the task in at least one TEE 124 based on an execution plan, to obtain an execution result. The second apparatus 120 may first create one or more TEEs 124, for example, depending on the available computing resources, current workload, and/or other factors. If it is determined that more than one TEE 124 is needed, the plurality of functions may be distributed across the more than one TEE 124 for execution.

The execution plan indicates how the plurality of functions are executed in the one or more TEEs 124 during the actual execution of the whole task. In some example embodiments, the execution plan may at least indicate an execution order of the plurality of functions. During execution of the functions, one or more functions may receive input data of the task to process; a function may receive a result of execution of one or more predecessor functions to further process; a result of execution of the last function is provided as a final result of the task. The execution order of the functions may be represented as an arbitrary Directed Acyclic Graph (DAG), where nodes in the DAG represents respective functions, and a directed edge from a node to another node indicates that the function corresponding to the node provides its result as an input to the function corresponding to the other node.

During the execution of the whole task, the untrusted area 122 of the second apparatus 120 may control the order in which the plurality of functions are executed in the one or more TEEs 124. Generally the correct execution order of the plurality of functions is specified in the request. In the ideal situation, the untrusted area 122 will follow the correct execution order of the functions when invoking those functions to be executed in the TEE(s) 124.

In some example embodiments, the execution plan may further indicate distribution of the plurality of functions across the one or more created TEEs 124. If a plurality of TEEs 124 are created for execution of the task, one or more of the functions may be invoked and executed in one TEE 124 while one or more of the functions may be invoked and executed in another TEE 124. In an example embodiment, it is the untrusted area 122 that determines which one of the functions can be invoked and executed in which one of the TEEs 124. In a further example embodiment, the first apparatus 110 may specify the distribution of the plurality of functions in the request, for example, by requiring all the functions to be executed within a single TEE 124, or by requiring some of the functions to be executed in one TEE 124 and remaining functions to be executed in the one or more other TEEs 124. Since the untrusted area 122 controls the execution of the functions in the TEE(s), in the ideal situation, the untrusted area 122 may follow the specified distribution of the functions while executing the task.

Considering potential threats happened in the remote execution of the task at the second apparatus 120, it is desired to support verifiability of an execution result of the task, so as to ensure the confidentiality and integrity of the execution result. In example embodiments of the present disclosure, to support verifiable computation, the first apparatus 110 generates 215 a first validation key based on an expected execution plan for the plurality of functions. The first validation key is generated from identification information of the plurality of functions. Identification information of a function is used to at least uniquely identify this function from all the functions of the current task. The identification information may be set in any form to identify the function.

The expected execution plan may indicate, from the side of the first apparatus 110, how the plurality of functions are expected to be executed by the second apparatus 120. In some example embodiments, the expected execution plan may indicate a correct execution order of the plurality of functions specified in the request for execution of the task. In some example embodiments, the expected execution plan may also indicate distribution of the plurality of functions across the one or more TEEs 124 of the second apparatus 120. In an example embodiment, the second apparatus 120 may transmit information regarding the distribution across the TEE(s) 124 to the first apparatus 110 after the untrusted area 122 creates and assigns those functions to the TEE(s) 124. In a further example embodiment, the first apparatus 110 may specify the distribution of the plurality of functions across one or more TEEs 124 in the request, for example, by requiring all the functions to be executed within a single TEE 124, or requiring some of the functions to be executed in one TEE 124 and the remaining functions to be executed in the other TEE 124.

At the remote side, the second apparatus 120 also generates 220 a second validation key based on an execution plan for the plurality of functions that is actually followed in the one or more TEEs 124. The second validation key is also generated from the identification information of the plurality of functions. The identification information of the functions used by the first and second apparatus 120 and 120 are the same. Such identification information may be provided by the first apparatus 110 along with the request, or may be preconfigured in other manner. The second apparatus 120 then transmits 225 the execution result for the task and the second validation key to the first apparatus 110.

The first apparatus 110, upon receipt of the execution result and the second validation key, determines 230 correctness of the execution result by comparing the first validation key with the second validation key. Specifically, if the received second validation key is the same as the first validation key generated locally, the first apparatus 110 determines that the execution result is correct and trusted. Otherwise, if the second validation key is different from the first validation key generated locally, the first apparatus 110 determines that the execution result is incorrect.

The difference between the first and second validation keys can indicate a difference between the expected execution plan at the first apparatus 110 and the actual execution plan performed at the second apparatus 120. By comparison of the two validation keys, it is possible to verify whether the execution at the second apparatus 120 actually follows the expected execution plan for the task, and thus verify the correctness of the execution. The deviation of the actual execution plan from the expected execution plan is typically due to attacks or malicious activity happened during the execution of the task, which may in turn reflect that the execution result may not be trusted in such case.

Using the (expected) execution plan to generate the validation keys for verifying the execution result correctness is mainly based on the inventors' observations that potential threats happened in a TEE-enabled computing environment (such as the second apparatus 120) are mostly related to execution plan tempering. To better understand the example embodiments of the present disclosure, such potential threats are briefly introduced below.

Particularly, with the security properties of the TEEs, the execution inside the TEEs is considered secure, not only the static code block before TEE initialization but also the actual execution process of the assigned function(s), which can lead to provision of confidentiality and integrity of execution inside the TEEs. However, the computing environment fails to provide the confidentiality and integrity of execution outside the TEEs. Typically, the controller application, which controls the order in which functions inside the TEEs are invoked, is deployed in the untrusted area outside the TEEs. Thus, an attack to the untrusted area may change the order of one or more functions of the tasks. Such attack is known as a disarranging data-related code (DDRC) attack. Since the integrity of the untrusted execution code is generally not verified during operation, the attestation scheme in the TEE-enabled computing environment cannot detect the disarrangement of the code, making it vulnerable to attacks.

Figure 3:
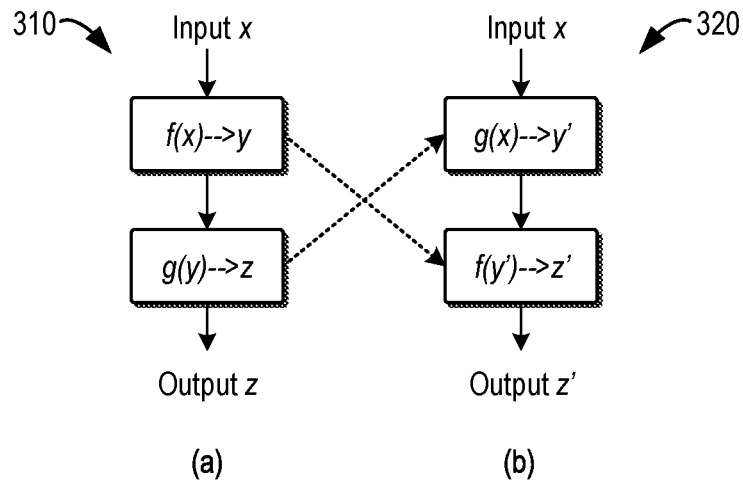
FIG. 3 illustrates an example showing change of an execution order of functions according to some example embodiments of the present disclosure.

FIG. 3 illustrates an example showing change of an execution order of functions according to some example embodiments of the present disclosure. In this example, it is assumed that a task includes two functions, represented as $f(\cdot)$ and $g(\cdot)$, which are executed in a TEE and input data to be processed in the task is represented as x. In FIG. 3 (*a*), the two functions are performed in a correct execution order 310 according to invocation from the untrusted area outside the TEE, to output an execution result z. If the untrusted area is attacked and the execution order 310 is changed to be an execution order 320 shown in FIG. 3 (*b*), where the function $g(\cdot)$ is first executed to process the input data x and produce a result y', represented as $g(x) \rightarrow y'$. The function $f(\cdot)$ is then invoked and executed to process the result y' and produce the output z', represented as $f(y') \rightarrow z'$. The output z' is very likely to be different from the correct output z.

Other potential threats may include TEE output tempering and output misrouting. These threats may happen in the case when information is exchanged between two TEEs. Regarding the output tempering, if a result of execution of a function inside a first TEE is transmitted to the untrusted area, an attacker or a malicious application may duplicate, eliminate, and temper with the result. Then the wrong result might be input to a second TEE for subsequent processing. Regarding output misrouting, an attacker or a malicious application may also route the result of another TEE but not that of the first TEE to the second TEE. Further, input data or a request for execution of a task may also be tempered with or misrouted. All those attacks may lead to an incorrect final result of the task.

In view of the above, there has been proposed to generate the validation keys for verification at both the first apparatus 110 (the requestor) and the second apparatus 120 (the executor) based on the execution plans acknowledged at the two apparatuses. To defend the security threats possibly happened in the TEE-enabled environment, the validation keys can be used to verify an execution order of functions of a task and possibly data routing between TEEs (in the case of assigning the functions to more than one TEE) during execution.

In some example embodiments, it is desired that the first and second validation keys can indicate the execution order of the functions and/or the data routing during the execution; that is, a different execution order or a change in the data routing may lead to a different validation key. In some further example embodiments, it is also desired that the first apparatus 110 can compute a validation key indicating the correct execution plan without actually performing the operations that are executed in the remote side. The generation of the first and second validation keys will be described in detail in the following example embodiments.
Generation of Second Validation Key at Remote Side It is now described some example embodiments of the generation of the second validation key at the second apparatus 120.

In some example embodiments, during generation of the second validation key, an intermediate key may be generated for each of the plurality of functions. The intermediate key is generated inside a TEE 124 within which the corresponding function is executed, which can ensure the security and confidentiality of the intermediate key. For example, the generation operation of the intermediate key may be configured as a part of the function and can be performed after the function is invoked and executed in the TEE. Of course, the generation operation of the intermediate key may also be configured as an independent executable component and may be invoked by the untrusted area 122 together with the corresponding function to execute in the TEE 124.

In some example embodiments, to indicate the execution order of the plurality of functions of the task, the intermediate keys for the plurality of functions are generated in the execution order, where an intermediate key for a function is determined at least based on an intermediate key for a predecessor function of the function in the execution order. An intermediate key of a function may be maintained in the TEEs 124, which can be accessed for use in generation of an intermediate key of the following function. After determination of all the intermediate keys in the one or more TEEs 124, the second validation key may be determined based on the intermediate key generated for the last function.

Among the plurality of functions of the task, for any given function, a function from which the given function receives a result of execution as an input is referred to as a predecessor function of the given function, while a function to which the given function outputs its result of execution is referred to a successor function of the given function. A given function may have zero, one, or more predecessor functions, and may have zero, one, or more successor functions. In particular, the first function in the execution order has no predecessor function, and the last function in the execution order has zero successor function. The execution relationship between the functions can be determined, for example, by a DAG representing the execution order of those functions.

The generation of an intermediate key for a given function may depend on various factors. In some example embodiments, the intermediate key for the given function may be determined based on the number of predecessor functions (referred to as a "first number" sometimes hereinafter) and the number of successor functions (referred to as a "second number" sometimes hereinafter). That is, the location of the function in the execution order may determine how its intermediate key is calculated.

In some example embodiments where the plurality of functions of the tasks are distributed to two or more TEEs 124 to execute, the distribution of the functions across the TEEs 124 may also be considered in generation of the intermediate keys for the functions. Specifically, in generation of an intermediate key for a given function, it may be further determined whether one or more predecessor functions (if any) of the given function are executed in a same TEE 124 as that of the given function, and/or whether one or more successor functions (if any) of the given are is executed in a same TEE 124 as that of the given function.
Generation of Intermediate Keys for Functions in Example Scenarios There may be three main scenarios when generating the second validation key by generating the intermediate keys according to the execution plan. First, all the functions are invoked and executed in a same TEE 124. Second, the functions are distributed to two or more different TEEs 124 for execution. Third, the execution order of two or more functions are exchangeable but the execution of some other functions may not be exchanged. Some examples of those scenarios and the generation of the intermediate keys and the final second validation key in those examples will be discussed in the following.

Figure 4A:
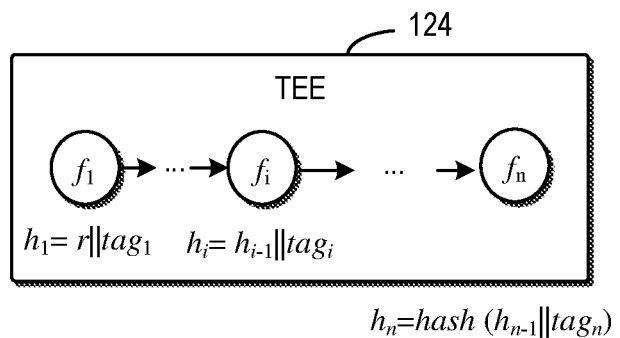
FIGS. 4A-4D illustrate some examples of execution plans according to some example embodiments of the present disclosure.

In a first example scenario, a plurality of functions of a task are executed in a same TEE 124 in a sequence. FIG. 4A shows an example in such sensation where a task includes n functions and those functions are invoked to be executed in a sequence in a same TEE 124. For any two adjacent functions, represented as $f_{i-1}$ and $f_i$, the intermediate key of the function $f_{i-1}$ is represented as $h_{i-1}$. The intermediate key of the function $f_i$ may be determined by concatenating the intermediate key of its predecessor function $f_{i-1}$ and the identification information (represented as "$tag_i$") of the current function $f_i$, i.e., $h_i=h_{i-1}\|tag_i$, where $\|$ represents a concatenation operation. The concatenation operation has a property that different concatenating orders of two factors may result in different concatenating results if the two factors are different, which can be represented as, for any $m_0 \neq m_1$, $m_0\|m_1 \neq m_1\|m_0$. Thus, the resulting intermediate key of a function can indicate the execution order of the predecessor functions. Different requested tasks with different orders can result in different validation keys for verification of the execution. The use of the concatenation operation within the TEE can reduce the computation overhead.

In some example embodiments, for the first function $f_1$ that has no predecessor function, its intermediate key may be determined, for example, as its identification information, or by concatenating a random number (represented as r) and the identification information, i.e., $h_1=r\|tag_1$. This random number may be a same random number used in generation of the first validation key, specifically, in generation of the intermediate key of the first function.

The random number can facilitate defense against replay attacks. In different requests for different tasks in operation, the random number may be selected as different. In some example embodiments, the random number may be selected by the first apparatus 110 and transmitted to the second apparatus 120, for example, together with the request for execution of the task. In some example embodiments, the random number may be determined based on input data to be processed in the task, for example, by applying a hash function to the input data, represented as r-hash (D), where D represents the input data and hash (•) represents a hash function. Any suitable hash function can be applied here. The generated random number can uniquely identify the input data and any change in the input data will produce a different random number. By determining the random number based on the input data, the same request with different input data may lead to different validation keys.

In some example embodiments, for the last function $f_n$ which has no successor function, the intermediate key may be determined by concatenating the intermediate key of its predecessor function $f_{n-1}$ and the identification information of the current function $f_n$, i.e., $h_{n-1}\|tag_n$, and applying a hash function to the concatenated result, i.e., $h_n=\text{hash}(h_{n-1}\|tag_n)$. The application of the hash function can reduce the amount of information to be conveyed and can produce a unique identifier for the information to be hashed ($h_{n-1}\|tag_n$ in this example). As such, any change in the information may result in a different hash value.

In the example scenario shown in FIG. 4A, all the functions may be generally divided into the following two categories where different approaches are utilized to calculate intermediate keys in the two different categories. A first category includes one or more functions similar to the first function $f_1$ which have no predecessor function. The first category further includes other functions $f_i$ (where $2 \le i \le n-1$, n is the number of total functions). For functions in the first category, their intermediate keys can be determined by means of the concatenation operation. A second category includes one or more functions similar to the last function $f_n$ which have no successor function. The generation of the intermediate key for the last function may involve the concatenation operation and the hashing operation. The intermediate key of the last function, i.e., $h_n=\text{hash}(h_{n-1}\|tag_n)$, may be used to determine the second validation key of the task in some example embodiments.

In a second example scenario, a plurality of functions of a task are executed in different TEEs 124 in a sequence. In such scenario, there may be two adjacent functions that are executed in different TEEs 124. In an example shown in FIG. 4B, a task includes n functions which are executed in two TEEs, i.e., the TEE 124-1 and the TEE 124-2. In this example, two adjacent functions $f_k$ and $f_{k+1}$ are executed in the TEE 124-1 and the TEE 124-2, respectively. As a predecessor function of the function $f_{k+1}$, a result of execution of the function $f_k$ will be passed from the TEE 124-1 to the TEE 124-2.

The calculations of the intermediate keys for the functions prior to the function $f_k$ may be similar to described in the above sensation with respect to FIG. 4A. In some example embodiments, to calculate the intermediate key for the function $f_k$, the intermediate key $h_{k-1}$ of its predecessor function $f_{k-1}$ and the identification information $tag_k$ of the function $f_k$ may be concatenated as $h_{k-1}\|tag_k$ and then a hash function may be applied to the concatenated result to obtain hash ($h_{k-1}\|tag_k$). In some example embodiments, the hash value hash ($h_{k-1}\|tag_k$) is further converted based on a result of execution of the function $f_k$ that is provided to the TEE 124-2 as input of the function $f_k$, than the intermediate key $h_k$ of the function $f_k$ is obtained. In an example embodiment, the conversion may be performed by applying an XOR operation, i.e., $h_k=\text{hash}(h_{k-1}\|tag_k) \oplus \text{hash}(\text{result}_{fk})$, where $\text{result}_{fk}$ represents the result of execution of the function $f_k$ that is generated in the TEE 124-1, and $\oplus$ represents the XOR operation. The intermediate key $h_k$ may be passed, for example, via a security channel, from the TEE 124-1 to the TEE 124-2 for calculating an intermediate key of the function $f_{k+1}$.

The result of execution of the function $f_k$ is also provided to the TEE 124-2 as input of the function $f_{k+1}$. As mentioned above, due to some potential attacks, the actual result received at the TEE 124-2 may be a tampered version of the result from the function $f_k$ or a misrouted version of other data. The result of execution of the predecessor function $f_k$ that is actually obtained in the TEE 124-2 may be represented as $\text{result}'_{fk}$. In some example embodiments, after the function $f_{k+1}$ is executed, an intermediate key $h_{k+1}$ for the function $f_{k+1}$ may be generated by converting the intermediate key $h_k$ of the function $f_k$ based on the obtained result $\text{result}'_{fk}$. For example, the conversion may be performed by applying a hash function to the result $\text{result}'_{fk}$, and then performing an XOR operation between the intermediate key $h_k$ and the hashed result hash($\text{result}'_{fk}$), i.e., $h_k \oplus \text{hash}(\text{result}'_{fk})$. The intermediate key $h_{k+1}$ is then generated by concatenating the result of the XOR operation and the identification information $tag_{k+1}$ of the function $f_{k+1}$, i.e. $h_{k+1}=(h_k \oplus \text{hash}(\text{result}'_{fk}))\|tag_{k+1}$.

The XOR operation utilized here is to take advantage of the following property, i.e., for any $m_0$ and $m_1$, $m_0 \oplus m_1 \oplus m_1 = m_0$. Depending on this property, if the result $\text{result}'_{fk}$ of execution of function $f_k$ obtained in the TEE 124-2 is equal to the correct result $\text{result}_{fk}$ of execution of function $f_k$ generated in the TEE 124-1, the intermediate key $h_{k+1}$ of the function $f_{k+1}$ can be rewritten as below.

$$h_k \oplus \text{hash}(\text{result}'_{fk}) = \text{hash}(h_{k-1}\|tag_k) \oplus \text{hash}(\text{result}_{fk}) \oplus \quad \text{Equation (1)}$$
$$\text{hash}(\text{result}'_{fk}) = \text{hash}(h_{k-1}\|tag_k)$$

It can be seen from the above Equation (1) that hash ($\text{result}_{fk}$) cancel out hash($\text{result}'_{fk}$), thus the impact of the result exchanged between the functions can be cancelled from the resulting second validation key. If the result $\text{result}'_{fk}$ is different from the correct result $\text{result}_{fk}$, which potentially indicates the result $\text{result}_{fk}$ is wrong and untrusted, the intermediate key $h_k$ is different from the one calculated in the case of two equal results and in turns the resulting second validation key is different. By means of the above property of the XOR operation utilized at the second apparatus 120, the first validation key at the first apparatus 110 can be calculated without requiring the intermediate results exchanged between TEEs and used to check whether the execution plan is correctly performed by comparing with the second validation key. In the ideal condition having no any attack, the first and second validation keys will be the same. Otherwise, any change to the result exchanged between TEEs 124 will cause difference between the two validation keys.

Figure 4B:
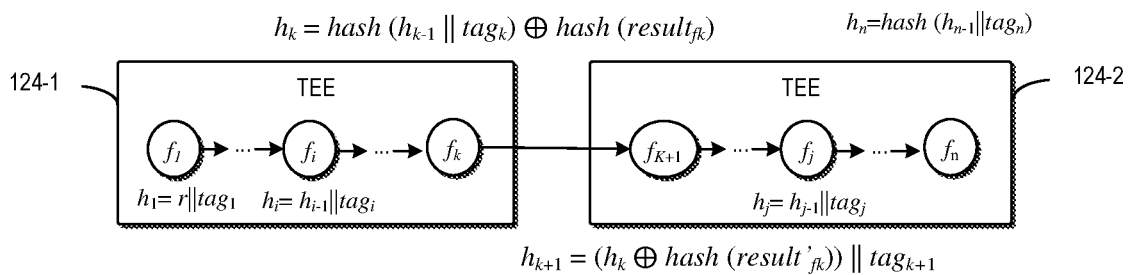

In FIG. 4B, the successor functions of the function $f_{k+1}$ are all in the same TEE 124-2, and thus their intermediate keys may be determined in a similar way as described in the above sensation with respect to FIG. 4A. The intermediate key of the last function, i.e., $h_n=\text{hash}(h_{n-1}\|tag_n)$, may be determined as the second validation key of the task or may be further processed to determine the second validation key in some example embodiments.

In the example scenario shown in FIG. 4B, all the functions may be generally divided into the following four categories, where different approaches are utilized to calculate intermediate keys in the two different categories. The four categories include the two same categories as in the example scenario of FIG. 4A. A third category include one or more functions similar to the function $f_k$, which has one predecessor function in the same TEE as it is (the TEE 124-1 in the shown example) and has one or more successor functions in the other TEE(s) (the TEE 124-2 in the shown example). A fourth category include one or more functions similar to the function $f_{k+1}$, which has one predecessor function in the other TEE(s) (the TEE 124-1 in the shown example) and has one or more successor functions in the same TEE as it is (the TEE 124-2 in the shown example). In the example of FIG. 4B, if the function $f_{k+1}$ is the last function of the task, a further hash function is applied to generate the intermediate key for the function $f_{k+1}$ as, for example, $h_{k+1}=(h_k \oplus \text{hash}(\text{result}'_{fk}))\|\text{tag}_{k+1})$.

Figure 4C:
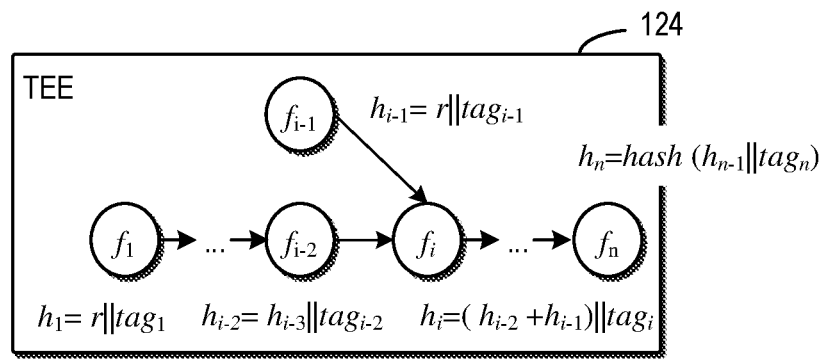

In a further example scenario, among the plurality of functions, some of the functions are exchangeable without causing an incorrect result. This is common in many cases of distributed computing, such as batch computing, stream computing, and so on. FIG. 4C shows an example in such sensation where a task includes n functions that are invoked to be executed in a same TEE 124. Among the n functions, the functions $f_{i-2}$ and $f_{i-1}$ are both predecessor functions of the function $f_i$. Exchanging the execution order of the functions $f_{i-2}$ and $f_{i-1}$ will not lead to a wrong result of execution of the function $f_i$. Thus, exchanging this kind of functions can be allowed, which means that the execution order of the functions is exchangeable. The validation keys may remain unchanged when the execution order of such functions are changed.

In some example embodiments, a binary operation, which satisfies the commutative law, is applied when computing the intermediate key of a function which has order-exchangeable predecessor functions. In the example, to calculate the intermediate key $h_i$ for the function $f_i$, the intermediate keys for the functions $f_{i-2}$ and $f_{i-1}$ are combined together, for example, via a binary operation. As such, no matter which one of the functions $f_{i-2}$ and $f_{i-1}$ is invoked and executed first, the intermediate key for the function $f_i$ may not be changed. The combined result is then concatenated with the identification information $\text{tag}_i$ of the function $f_i$ to generate intermediate key $h_i$, i.e., $h_i=(\Sigma_k h_k)\|\text{tag}_i$ (in the shown example, $h_i=((h_{i-2}+h_{i-1})\|\text{tag}_i)$.

It would be appreciated that the order-exchangeable functions shown in FIG. 4C is merely an example. There may be various other exchangeable structures depending on the execution plans of different tasks.

Figure 4D:
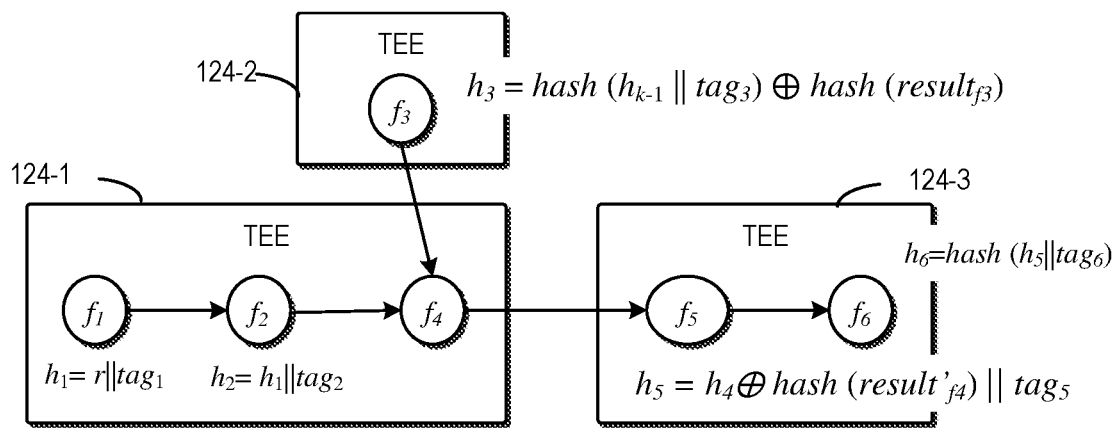

FIG. 4D shows a hybrid example based on the above example scenarios, where six functions of a task are distributed for execution across three TEEs 124, i.e., the TEE 124-1, TEE 124-2, and TEE 124-3. The functions $f_1$, $f_2$, and $f_4$ are executed in the same TEE 124-1, $f_3$ is executed in the TEE 124-2, and $f_5$, and $f_6$ are executed in the same TEE 124-3. The intermediate keys $h_i$ to $h_6$ are provided in FIG. 4D, where $\text{result}_{f3}$ and $\text{result}_{f4}$ represent the actual results of execution of the functions $f_3$ and $f_4$, respectively, and represents $\text{result}'_{f3}$ and $\text{result}'_{f4}$ represent the results of execution of the functions $f_3$ and $f_4$ that are received in the TEE 124-1 and TEE 124-3, respectively.

The intermediate key $h_6$ for the last function $f_6$ may represent the overall execution plan/path of all the six functions and may be considered as the second validation key of the task in the example of FIG. 4D. By expansion of the intermediate key $h_6$ may be provided as follows:

$$h_6=\text{hash}((((\text{hash}(((r\|\text{tag}_1)\|\text{tag}_2)+(\text{hash}(r\|\text{tag}_3)\oplus\text{hash}(\text{result}_{f3})\oplus\text{hash}(\text{result}'_{f3})\|\text{tag}_4)\oplus\text{hash}(\text{result}_{f4})\oplus\text{hash}(\text{result}'_{f4}))\|\text{tag}_5)\|\text{tag}_6) \quad \text{Equation (2)}$$

If $\text{result}_{f3}$ is equal to $\text{result}'_{f3}$ and $\text{result}_{f4}$ is equal to $\text{result}'_{f4}$, due to the property of the XOR operation, the intermediate key $h_6$ in Equation (2) may be represented as:

$$h_6=\text{hash}(\text{hash}(((r\|\text{tag}_1)\|\text{tag}_2)+\text{hash}(r\|\text{tag}_3))\|\text{tag}_4)\|\text{tag}_5)\|\text{tag}_6) \quad \text{Equation (3)}$$

Processes for Generating an Intermediate Key

Some different scenarios of execution plans for tasks have been described above. For any given function of a plurality of functions of a certain task, the intermediate key may be determined depending on factors such as the number and the distribution of the predecessor function(s) and successor function(s) of the given function. As mentioned above, the generation of the intermediate key for a function may be incorporated as a part of the function and can be performed after the function is invoked and executed in the TEE.

In some example embodiments, for a given function, validation information may be determined from at least identification information of the given function and possibly the random number or the intermediate key(s) of the predecessor function(s). The generation of the validation information may be based on the number of the predecessor functions (zero, one, or larger than one). The validation information may be used to further generate the intermediate key for the given function based on the number of successor function(s) (zero, one, or larger than one).

In some example embodiments, in order to defend the output tempering and/or misrouting attack, whether the predecessor function(s) and the successor function(s) for the given function is executed in a same TEE as that of the given function is also taken into account in determining the validation information and determining the intermediate key from the validation information.

Figure 5A:
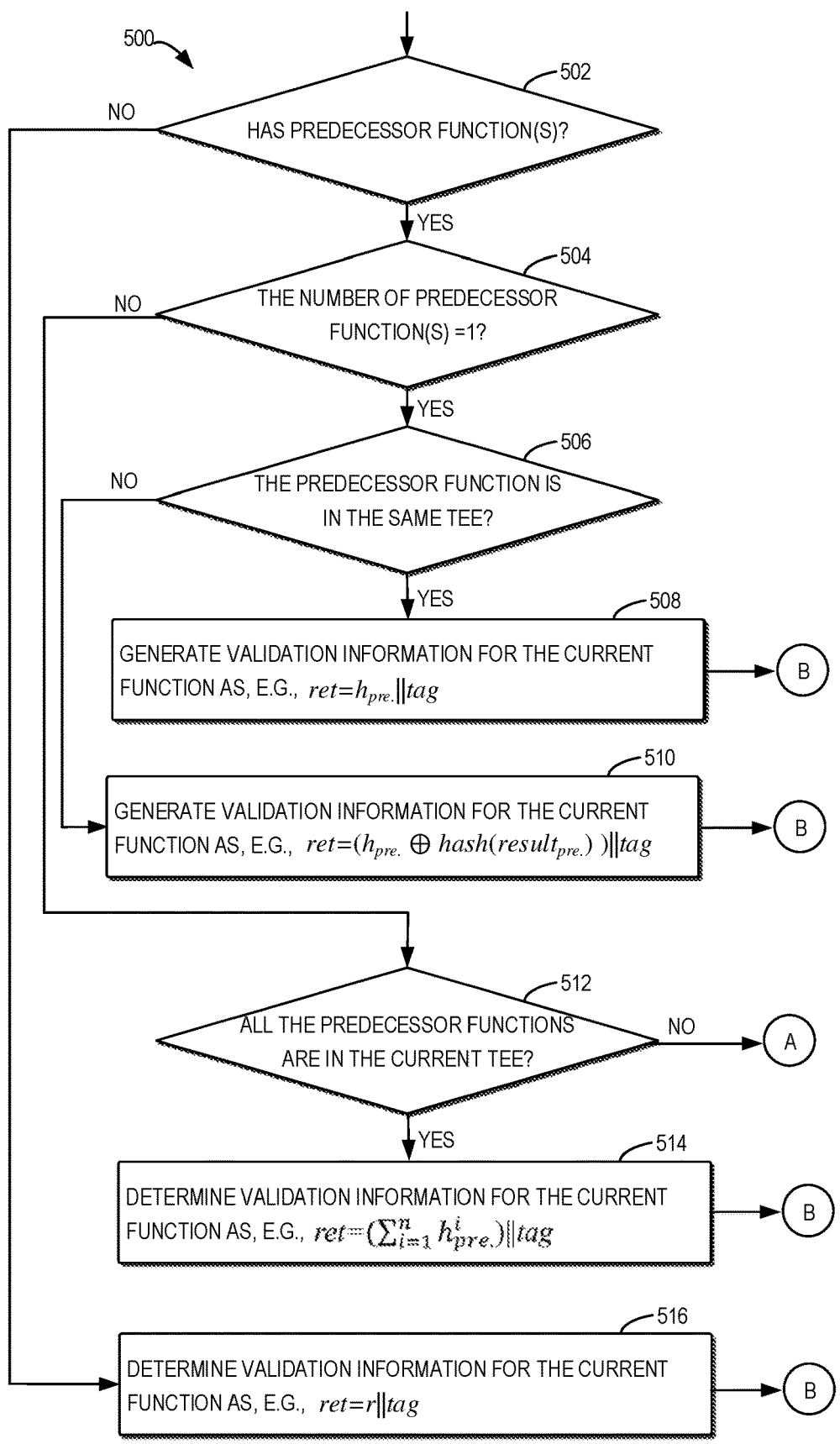
FIGS. 5A-5C illustrate processes for generating an intermediate key for a given function at a second apparatus according to some example embodiments of the present disclosure.
Figure 5B:
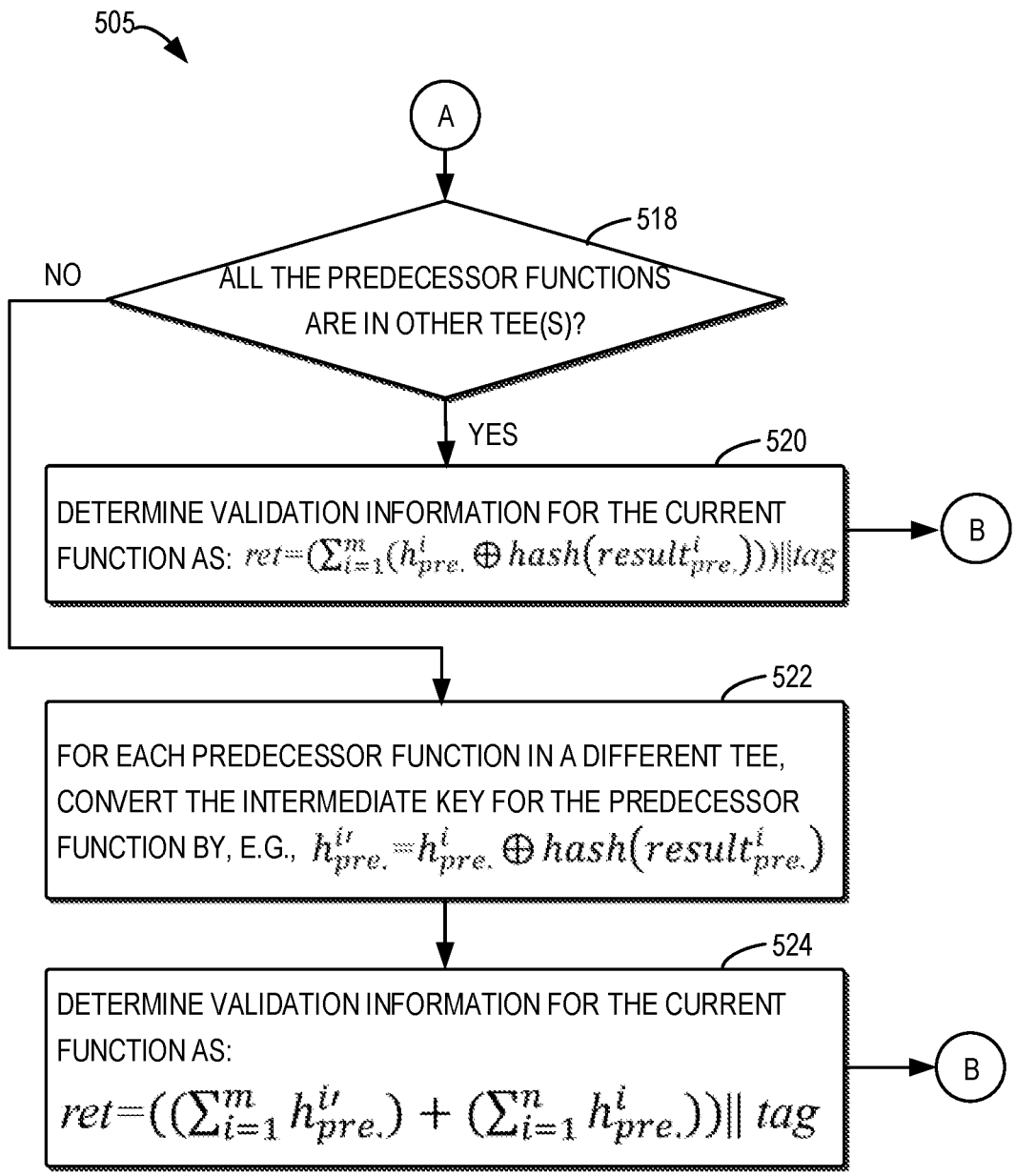
Figure 5C:
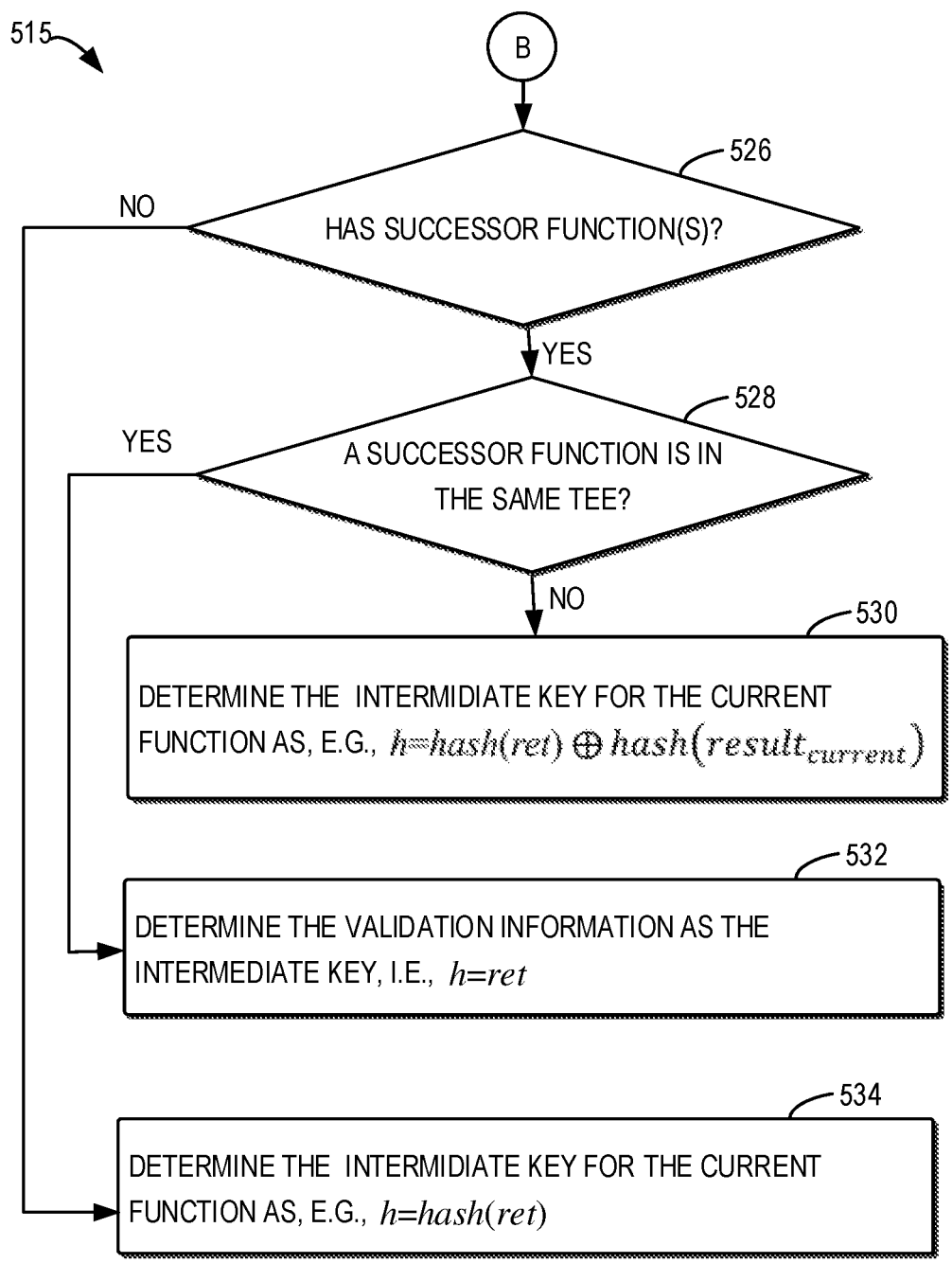

FIGS. 5A, 5B, and 5C illustrate processes 500, 505, and 515 for generating an intermediate key for a given function according to some example embodiments of the present disclosure. The given function may be any function of the plurality of functions of the task executed in the second apparatus 120. Intermediate keys for the plurality of functions may be determined according to the processes shown in FIGS. 5A-5C in the execution order. In some example embodiments, the processes 500, 505, and 515 may be executed by the second apparatus 120, and more specifically, performed in a TEE of the second apparatus 120. In the following description, the processes 500, 505, and 515 are described from the perspective of the second apparatus 120.

In some example embodiments, the processes 500, 505, and 515 may be performed to generate an intermediate key of a function after the corresponding function is invoked, for example, by the untrusted area 122, into a TEE 124 and has been executed in the TEE 124. In the processes 500, 505, and 515, a function for which an intermediate key is generated is referred to as a "current function."

At block 502, the second apparatus 120 determines whether the current function has a predecessor function(s). If it is determined that the current function has no predecessor function, which indicates that the current function may receive input data of the task to process, the second apparatus 120 determines, at block 516, the validation information (represented as "ret") for the current function from the identification information (represented as "tag") of the current function and possibly from a random number (represented as "r"). In an example embodiment, the validation information may be determined by concatenating the random number and the identification information, i.e., ret=r∥tag.

If it is determined at block 502 that the current function has a predecessor function(s), at block 504, the second apparatus 120 determines whether the number of the predecessor function(s) is equal to one. If the current function has only one predecessor function, at block 506, the second apparatus 120 determines whether the predecessor function has been executed in a same TEE 124 as that of the current function.

At block 508, if the predecessor function has been executed in the same TEE 124, the second apparatus 120 generates the validation information for the current function from the intermediate key (represented as "$h_{pre.}$") for the predecessor function and the identification information of the current function. In an example embodiment, the validation information may be determined by concatenating the intermediate key for the predecessor function and the identification information of the current function, i.e., ret=$h_{pre.}$∥tag.

At block 510, if the predecessor function has been executed in a different TEE 124 than that of the current function, the second apparatus 120 generates the validation information from the intermediate key for the predecessor function, the identification information of the current function, and a result (represented as "$result_{pre.}$") of execution of the predecessor function that is obtained in the TEE 124 of the current function. In an example embodiment, the validation information may be determined by applying a hash function to the obtained result of execution of the predecessor function, i.e., hash($result_{pre.}$), converting the intermediate key for the predecessor function based on the hashed result, and then concatenating the converted intermediate key and the identification information of the current function. The conversion of the intermediate key for the predecessor function may be performed by performing an XOR operation between the intermediate key for the predecessor function and the hashed result, i.e., $h_{pre.} \oplus \text{hash}(result_{pre.})$. In this example, the validation information for the current function may be determined as ret=($h_{pre.} \oplus \text{hash}(result_{pre.})$)∥tag.

In some example embodiments, if the number of the predecessor function(s) is not equal to one but is larger than one, the second apparatus 120 may further determine whether a plurality of predecessor functions have been executed in the same TEE 124 as that of the current function, whether all the plurality of predecessor functions have been executed in one or more different TEEs 124 than that of the current function, or whether some of the predecessor functions are executed in the same TEE 124 while some others are executed in one or more different TEEs 124. The determination regarding these three situations may be performed in any order, and FIG. 5A and FIG. 5B merely illustrate one example.

Specifically, at block 512, the second apparatus 120 determines whether all the plurality of predecessor functions for the current functions have been executed in the same TEE 124 as that of the current function. If all the predecessor functions have been executed in the same TEE 124, at block 514, the second apparatus 120 generates the validation information for the current function from the intermediate keys for the plurality of predecessor functions and the identification information of the current function. In an example embodiments, to generate the validation information, the intermediate keys for the plurality of predecessor functions may be combined to obtain a combined intermediate key, i.e., $(\Sigma_{i=1}^{n} h_{pre.}^{i})$, where n is the number of the predecessor functions executed in the same TEE, and $h_{pre.}^{i}$ represents the intermediate key for the i-th predecessor function. The combined intermediate key may then be concatenated with the identification information of the current function, i.e., ret=$(\Sigma_{i=1}^{n} h_{pre.}^{i})$∥tag.

If it is determined at block 512 that not all the plurality of predecessor functions for the current functions are executed in the same TEE 214 as that of the current function, at block 518 in the process 505, the second apparatus 120 determines whether all the predecessor functions have been executed in the one or more different TEEs 124 than that of the current function. If all the predecessor functions are determined as having been executed in the one or more different TEEs 124 than that of the current function, at block 520, the second apparatus 120 generates the validation information for the current function from the intermediate keys for the plurality of predecessor functions, the identification information of the current function, and the results of execution of the plurality of predecessor function that are obtained in the TEE 124 of the current function.

In an example embodiment, for each of the plurality of predecessor functions, a hash function is applied to a result (represented as "$result_{pre.}^{i}$") of execution of this predecessor function that is obtained in the TEE 124 executing the current function, and the intermediate key (represented as "$h_{pre.}^{i}$") for the predecessor function is converted, for example, by performing an XOR operation between the intermediate key for the predecessor function and the hashed result, i.e., $h_{pre.}^{i} \oplus \text{hash}(result_{pre.}^{i})$. The converted intermediate keys for the plurality of predecessor functions may be concatenated together to obtain a combined intermediate key by example, by aggregating (summing up) all the converted intermediate keys. Then the combined intermediate key and the identification information of the current function may be concatenated together to obtain the validation information for the current function, i.e., ret=$(\Sigma_{i=1}^{m}(h_{pre.}^{i} \oplus \text{hash}(result_{pre.}^{i})))$∥tag, where m represents the number of predecessor functions executed in the different TEE(s) 124 than that of the current function.

If the result is NO at the block 518, which means that there are one or more predecessor functions executed in the same TEE 124 as that of the current function and one or more other predecessor functions executed in at least one different TEE 124 than that of the current function, the second apparatus 120 determines the validation information for the current function from the intermediate keys for the plurality of predecessor functions, the identification information of the current function, and the obtained results of execution of one or more of predecessor functions executed in the at least one different TEE 124.

More specifically, at block 522, for each predecessor function that is executed in a different TEE 124, the second apparatus 120 converts the intermediate key for the predecessor function based on a result of execution of that predecessor function that is obtained in the TEE, to obtain the converted intermediate key (represented as "$h_{pre.}^{i\prime}$"). In an example embodiment, the second apparatus 120 may apply a hash function to the result of execution of the predecessor function to obtain a hashed result and then perform an XOR operation between the intermediate key for the predecessor function and the hashed result, to obtain the converted intermediate key, i.e., $h_{pre.}^{i\prime}=h_{pre.}^{i} \oplus \text{hash}(result_{pre.}^{i})$.

At block 524, the second apparatus 120 determines the validation information for the current function based on the converted intermediate keys and the identification information of the current function. The second apparatus 120 may combine the intermediate key for the one or more predecessor functions that are executed in the same TEE 124 and the converted intermediate keys for the one or more predecessor functions that are executed in the different TEE(s) 124, to obtain a combined intermediate key. That is, the combined intermediate key may be determined as, $(\Sigma_{i=1}^{m} h_{pre.}^{i'}) + (\Sigma_{i=1}^{n} h_{pre.}^{i})$, where m represents the number of the predecessor function(s) that are executed in the different TEE(s), n represents the number of the predecessor function(s) that are executed in the same TEE(s), and m and n are integer numbers larger than or equal to one. The combined intermediate key may be concatenated with the identification information of the current function to obtain the validation information for the current function, for example, $ret=((\Sigma_{i=1}^{m} h_{pre.}^{i'}) + (\Sigma_{i=1}^{n} h_{pre.}^{i}))||tag$.

Upon the validation information, i.e., ret for the current function is determined at block 508, 510, 514, 516, 520, or 524, in some example embodiments, the second apparatus 120 may further generate the intermediate key for the current function based on the number of the successor function(s) and the validation information in the process 515. At block 526, the second apparatus 120 determines whether the current function has any successor function(s). If it is determined that the current function has no successor function, the second apparatus 120 determines, at block 534, the intermediate key (represented as "h") for the current function by applying a hash function to the validation information ret determined in the process 500 or 505, i.e., h=hash(ret).

If it is determined at block 526 that the current function has one or more successor functions, at block 528, the second apparatus 120 further determines whether a successor function is executed in the same TEE 124 as that of the current function. If the second apparatus 120 determines that the successor function is not executed in the same TEE 124 but in a different TEE 124 from that of the current function, at block 530, the second apparatus 120 determines the intermediate key for the current function based on the validation information and a result ($result_{current}$) of execution of the current function. In an example embodiment, the second apparatus 120 may apply a hash function to the validation information to obtain hashed information, represented as hash(ret), and apply a hash function to the result of execution of the current function to obtain a hashed result, represented as hash($result_{current}$) The intermediate key for the current function may be generated from the hashed information and the hashed result. In an example, an XOR operation between the hashed information and the hashed result to obtain the intermediate key for the current function, i.e., h=hash(ret)$\oplus$hash($result_{current}$).

At block 532, if it is determined that the successor function is in the same TEE 124 as that of the current function, the second apparatus 120 may determine the validation information ret determined in the process 500 or 505 as the intermediate key (represented as "h") for the current function, i.e., h=ret.

In some example embodiments, if the current function has more than one successor function, then for each successor function, the operations at blocks 528, 530, and 532 are performed to generate an intermediate key to be transferred from the current function to the successor function.

For each of all the plurality of functions of the task executed in the second apparatus 120, the processes 500, 505, and 515 may be performed in the execution order after the function has been executed. The intermediate key generated for the last function may be used to determine the second validation key. The second validation key may be directly determined as the intermediate key for the last function or may be determined by applying a further operation (such as a hash operation) to the intermediate key for the last function.

The second validation key may be provided by the second apparatus 120 to the first apparatus 110 via a security channel. In some example embodiments, the second validation key generated in a TEE 124 may be signed with a TEE signature and then encrypted by a session key negotiated between the first and second apparatuses 110 and 120. Upon receipt of the cipher text, the first apparatus 110 may decrypt it using the session key and verify the validity of the TEE signature, for example, by calling a signature verification algorithm provided in the TEE-enable architecture. After verified the validity, the first apparatus 110 may use the second validation key to check the correctness of the execution of the task.

Generation of First Validation Key at Terminal Side

Some example embodiments of generation of the second validation key have been discussed above. It is now to further discuss some example embodiments of generation of the first validation key at the first apparatus 110. As mentioned above, the first validation key is generated according to the expected execution plan. The expected execution plan may reflect similar example scenarios as described above with reference to FIGS. 4A-4D.

Similarly to the generation of the second validation key, in some example embodiments, during generation of the first validation key, an intermediate key may be generated for each of the plurality of functions. The intermediate keys for the plurality of functions are generated in the execution order, where an intermediate key for a function is determined at least based on an intermediate key for a predecessor function of the function in the execution order.

The generation of an intermediate key for a given function at the first apparatus may also depend on the number of predecessor functions and the number of successor functions. In some example embodiments where the plurality of functions of the tasks are distributed to two or more TEEs 124 to execute, the distribution of the functions across the TEEs 124 may also be considered in generation of the intermediate keys for the functions. As mentioned above, such distribution information may be provided from the second apparatus 120 after the functions are assigned to the TEE(s) 124 or may be specified by the first apparatus 110 and provided as a request to the second apparatus 120. In the case of receiving the distribution information from the second apparatus, the generation of the first validation key may be performed after receiving such information.

In some example embodiments, for a given function, validation information may be determined from at least identification information of the given function and possibly the random number or the intermediate key(s) of the predecessor function(s). The generation of the validation information may be based on the number of the predecessor functions (zero, one, or larger than one). The validation information may be used to further generate the intermediate key for the given function based on the number of successor function(s) (zero, one, or larger than one).

In some example embodiments, in order to follow the special treatment to defend the output tempering and/or misrouting attack in generation the second validation key, whether the successor function(s) for the given function is executed in a same TEE as that of the given function is also taken into account in determining the validation information and determining the intermediate key from the validation information.

Figure 6A:
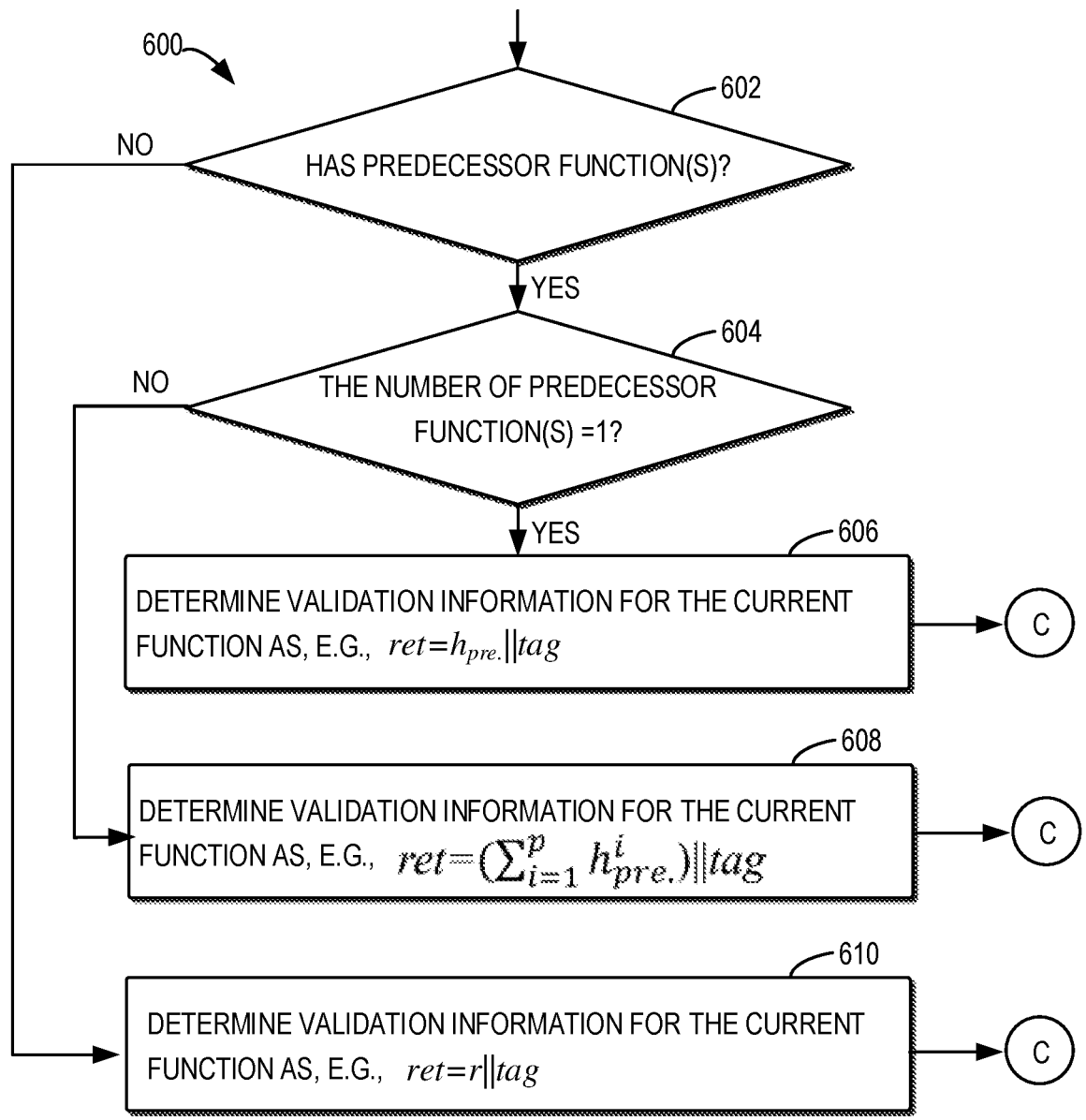
FIGS. 6A and 6B illustrate processes for generating an intermediate key for a given function at a first apparatus according to some example embodiments of the present disclosure.
Figure 6B:
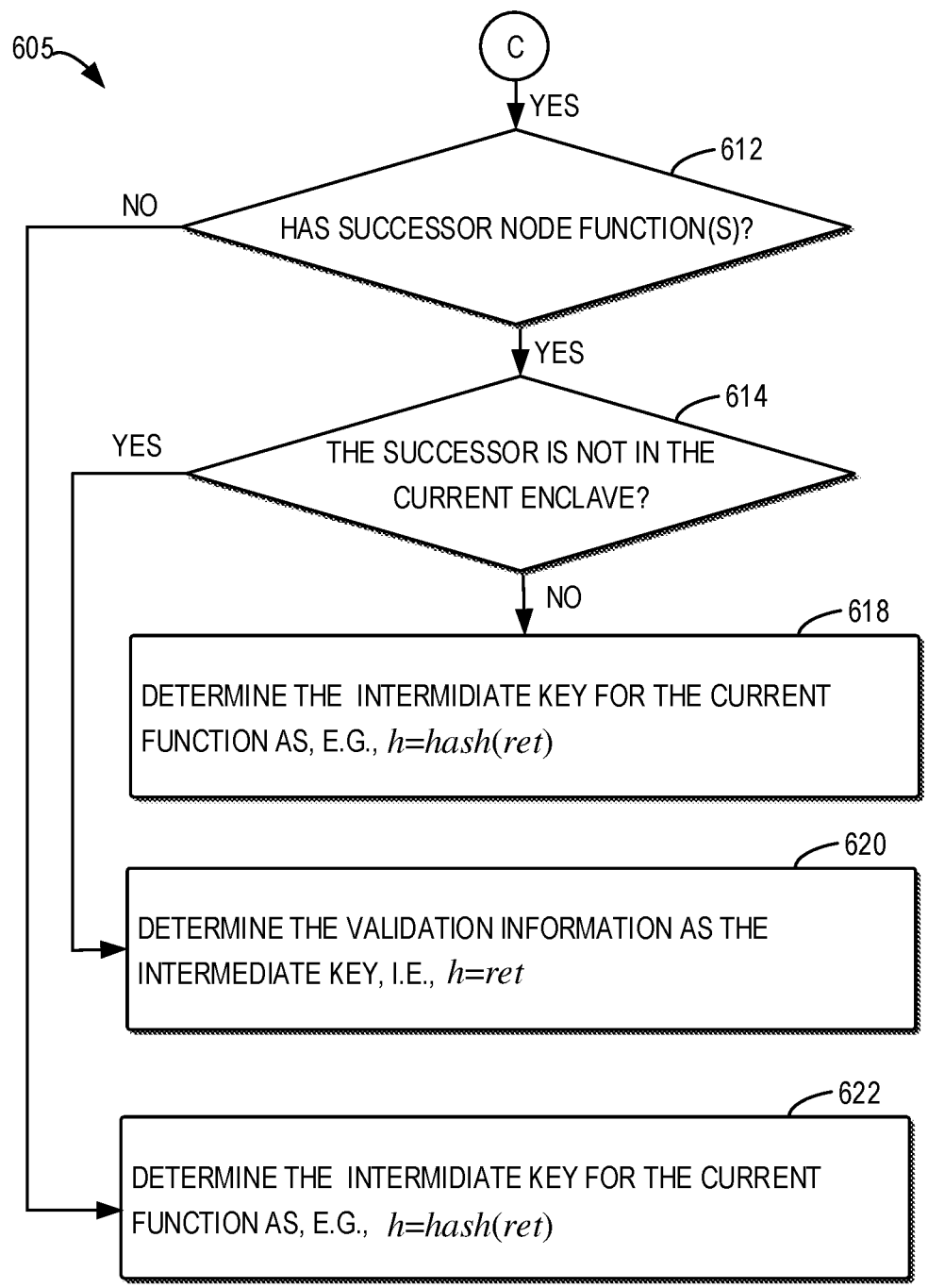

FIGS. 6A and 6B illustrate processes 600 and 605 for generating an intermediate key for a current function at the first apparatus 110 according to some example embodiments of the present disclosure. The current function may be any function of the plurality of functions of the task requested by the first apparatus 110. Intermediate keys for the plurality of functions may be determined according to the processes shown in FIGS. 6A-6B in the execution order. In some example embodiments, the processes 600 and 605 may be executed by the first apparatus 110. In the following description, the processes 600 and 605 are described from the perspective of the first apparatus 110. In the processes 600 and 605, a function for which an intermediate key is generated is referred to as a "current function."

At block 602, the first apparatus 110 determines whether the current function has a predecessor function(s). If it is determined that the current function has no predecessor function, which indicates that the current function may receive input data of the task to process, the first apparatus 110 determines, at block 610, the validation information (represented as "ret") for the current function from the identification information (represented as "tag") of the current function and possibly from a random number (represented as "r"). In an example embodiment, the validation information may be determined by concatenating the random number and the identification information, i.e., ret=r||tag.

If it is determined at block 602 that the current function has a predecessor function(s), at block 604, the first apparatus 110 determines whether the number of the predecessor function(s) is equal to one. If the current function has only one predecessor function, at block 606, the first apparatus 110 determines the validation information for the current function based on the intermediate key (represented as "$h_{pre.}$") for the predecessor function and the identification information. In an example embodiment, the validation information may be determined by concatenating the intermediate key for the predecessor function and the identification information of the current function, i.e., ret=$h_{pre.}$||tag.

In some example embodiments, if the number of the predecessor function(s) is not equal to one but is larger than one, at block 608, the first apparatus 110 determines the validation information for the current function based on the intermediate keys for the plurality of predecessor functions and the identification information of the current function. In an example embodiments, to generate the validation information, the intermediate keys for the plurality of predecessor functions may be combined to obtain a combined intermediate key, i.e., ($\Sigma_{i=1}^{P} h_{pre.}^{i}$), where p is the number of the predecessor functions for the current function and is an integer number larger than one, and $h_{pre.}^{i}$ represents the intermediate key for the i-th predecessor function. The combined intermediate key may then be concatenated with the identification information of the current function to obtain the validation information for the current function, i.e., ret=($\Sigma_{i=1}^{P} h_{pre.}^{i}$)||tag.

Upon the validation information ret for the current function is determined at block 606, 608, or 610, in some example embodiments, the first apparatus 110 may further generate the intermediate key for the current function based on the number of the successor function(s) and the validation information in the process 605. At block 612, the first apparatus 110 determines whether the current function has any successor function(s). If it is determined that the current function has no successor function, the first apparatus 110 determines, at block 622, the intermediate key (represented as "h") for the current function by applying a hash function to the validation information ret determined at block 606, 608, or 610, i.e., h=hash(ret).

If it is determined at block 612 that the current function has one or more successor functions, at block 614, the first apparatus 110 further determines whether a successor function is executed in the same TEE 124 as that of the current function. If the first apparatus 110 determines that the successor function is not executed in the same TEE 124 but in a different TEE 124 from that of the current function, at block 618, the first apparatus 110 determines the intermediate key for the current function by applying a hash function to the validation information ret determined in the process 600, i.e., h=hash(ret).

If the first apparatus 110 determines that the successor function is in the same TEE 124 as that of the current function, at block 620, the first apparatus 110 may determine the validation information ret determined in the process 600 as the intermediate key (represented as "h") for the current function, i.e., h=ret.

In some example embodiments, if the current function has more than one successor function, then for each successor function, the operations at blocks 614, 618, and 620 are performed to generate an intermediate key to be transferred from the current function to that successor function.

For each of all the plurality of functions of the task, the processes 600 and 605 may be performed by the first apparatus 110 in the execution order. The intermediate key generated for the last function may be used to determine the first validation key. The first validation key may be directly determined as the intermediate key for the last function or may be determined by applying a further operation (such as a hash operation) to the intermediate key for the last function. The first validation key may be compared with the second validation key to verify the correctness of the execution of the task.

According to various example embodiments of the present disclosure, it is possible to achieve verifiability of the correctness of the outsourced execution result meanwhile preserving data privacy in the TEEs. The proposed verification scheme can verify whether the execution order of the functions in the TEEs and/or the actual function inputs are equal to the correct or expected execution order and inputs. The introduction of the random number in some example embodiment can facilitate resist replay attacks. Further, the verifiable computation is highly efficient. In one aspect, the validation key generation and provision may be achieved in plaintext, which is much more efficient than the solutions based on a cipher text. In a further aspect, the validation key generation stage within the TEE may only require some concatenation computation and hash function, both of which are very computationally efficient. Moreover, the hash function is applied to compress the intermediate results to reduce the computation and storage overhead, which leads to communication efficient.

During the generation of the first and second validation keys, hash functions are applied to certain information/data to generate unique identifiers. The application of the hash functions can reduce computation overhead. The hash functions applied to calculate the random number and one or more of the intermediate keys for the functions of the task may be the same or different in generation of the first validation key or the second validation key. The same hash functions are used at the second apparatus 120 and the first apparatus 110 to calculate the corresponding random number and the intermediate keys for the functions of the tasks. It would be appreciated that in other example embodiments, instead of using the hash function, any other functions which can be used for generating a unique identifier for certain information/data can also be applied here.

It would be appreciated that while operations in the processes in FIGS. 5A-5C and 6A-6B are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Example Process

Figure 7:
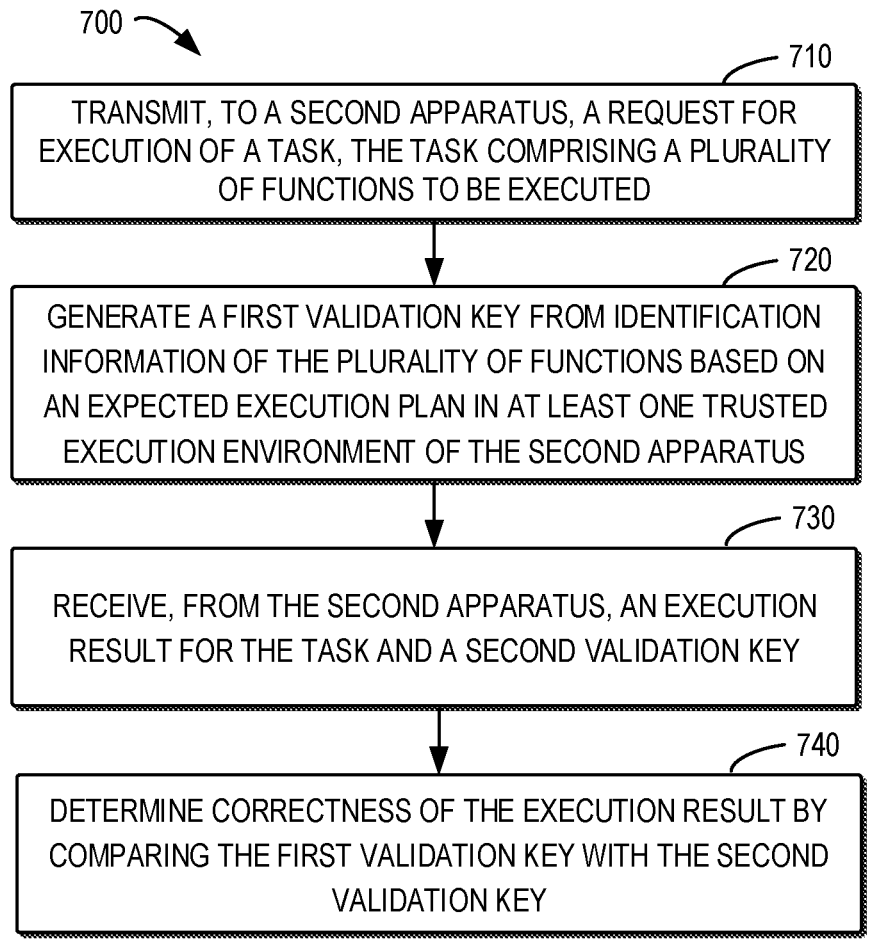
FIG. 7 illustrates a flowchart of an example method implemented at an apparatus requesting a task to be executed in accordance with some example embodiments of the present disclosure.

FIG. 7 shows a flowchart of an example method 700 implemented at an apparatus requesting a task to be executed in accordance with some example embodiments of the present disclosure. The apparatus may be the first apparatus 110 in FIG. 1. For the purpose of discussion, the method 700 will be described from the perspective of the first apparatus 110 with reference to FIG. 1.

At block 710, the first apparatus 110 transmits, to a second apparatus 120, a request for execution of a task. The task includes a plurality of functions to be executed. At block 720, the first apparatus 110 generates a first validation key from identification information of the plurality of functions based on an expected execution plan in at least one trusted execution environment of the second apparatus. At block 730, the first apparatus 110 receives, from the second apparatus, an execution result for the task and a second validation key. At block 740, the first apparatus 110 determines correctness of the execution result by comparing the first validation key with the second validation key.

In some example embodiments, the expected execution plan at least indicates an execution order of the plurality of functions. In some example embodiments, generating the first validation key comprises generating intermediate keys for the plurality of functions in the execution order, an intermediate key for a function being determined at least based on an intermediate key for a predecessor function of the function in the execution order; and determining the first validation key based on the generated intermediate key for a last function of the plurality of functions.

In some example embodiments, generating the intermediate keys comprises: for a given function of the plurality of functions, determining a first number of predecessor functions for the given function and a second number of successor functions for the given function in the execution order; generating validation information for the given function based on the first number; and generating the intermediate key for the given function based on the second number and the validation information.

In some example embodiments, generating the validation information comprises in response to the first number indicating one predecessor function, generating the validation information by concatenating the intermediate key for the one predecessor function and the identification information of the given function.

In some example embodiments, generating the validation information comprises in response to the first number indicating a plurality of predecessor functions, generating the validation information for the given function by: combining the intermediate keys for the plurality of predecessor functions to obtain a combined intermediate key, and concatenating the combined intermediate key and the identification information of the given function.

In some example embodiments, generating the validation information comprises in response to the first number indicating zero predecessor function, generating the validation information by concatenating a random number and the identification information of the given function, the random number being also used for generation of the second validation key.

In some example embodiments, the method further includes generating the random number by applying a hash function to input data to be processed in the task.

In some example embodiments, generating the intermediate key based on the second number and the validation information comprises in response to the second number indicating zero successor function, generating the intermediate key for the given function by applying a hash function to the validation information.

In some example embodiments, the expected execution plan further indicates distribution of the plurality of functions across the at least one trusted execution environment.

In some example embodiments, generating the intermediate key for the given function based on the second number and the validation information comprises: in response to the second number indicating at least one successor function, determining, based on the expected execution plan, whether the at least one successor function is executed in a different trusted execution environment than that of the given function; in response to determining that the at least one successor function is executed in a different trusted execution environment than that of the given function, generating the intermediate key for the given function by applying a hash function to the validation information; and in response to determining that the at least one successor function is executed in a same trusted execution environment as that of the given function, determining the validation information as the intermediate key for the given function.

In some example embodiments, determining the correctness of the execution result comprises in response to the second validation key being the same as the first validation key, determining that the execution result is correct; and in response to the second validation key being different from the first validation key, determining that the execution result is incorrect.

Figure 8:
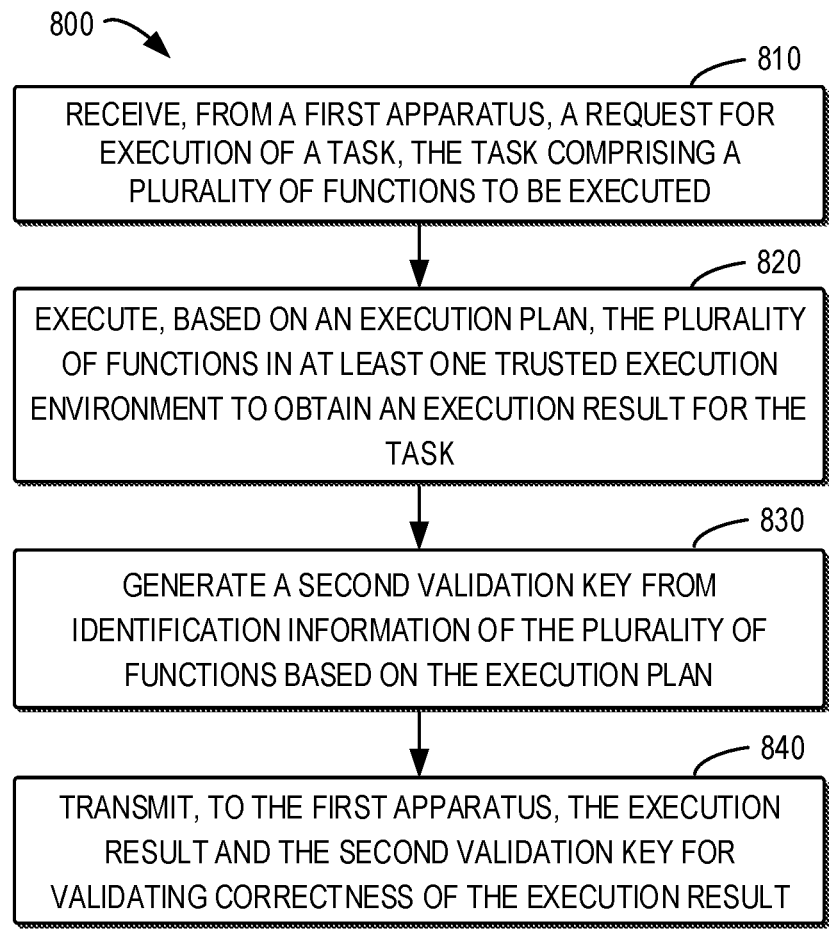
FIG. 8 illustrates a flowchart of an example method implemented at an apparatus executing a requested task in accordance with some example embodiments of the present disclosure.

FIG. 8 shows a flowchart of an example method 800 implemented at an apparatus executing a requested task in accordance with some example embodiments of the present disclosure. The apparatus may be the second apparatus 120 in FIG. 1. For the purpose of discussion, the method 800 will be described from the perspective of the second apparatus 120 with reference to FIG. 1.

At block 810, the second apparatus 120 receives, from a first apparatus 110, a request for execution of a task, the task comprising a plurality of functions to be executed. At block 820, the second apparatus 120 executes, based on an execution plan, the plurality of functions in at least one trusted execution environment to obtain an execution result for the task. At block 830, the second apparatus 120 generates a second validation key from identification information of the plurality of functions based on the execution plan. At block 840, the second apparatus 120 transmits, to the first apparatus 110, the execution result and the second validation key for validating correctness of the execution result.

In some example embodiments, the execution plan at least indicates an execution order of the plurality of functions. In some example embodiments, generating the second validation key comprises: generating intermediate keys for the plurality of functions in the execution order, an intermediate key for a function being determined at least based on an intermediate key for a predecessor function of the function in the execution order; and determining the second validation key based on the generated intermediate key for a last function of the plurality of functions.

In some example embodiments, generating the intermediate keys for the plurality of functions comprises: generating the intermediate keys for the plurality of functions within the in at least one trusted execution environment.

In some example embodiments, generating the intermediate keys comprises: for a given function of the plurality of functions, determining a first number of predecessor functions for the given function and a second number of successor functions for the given function in the execution order; generating validation information for the given function based on the first number of predecessor functions; and generating the intermediate key for the given function based on the second number and the validation information.

In some example embodiments, generating the validation information comprises: in response to the first number indicating zero predecessor function, generating the validation information by concatenating a random number and the identification information of the given function, the random number being also used by the first apparatus for generation of a first validation key.

In some example embodiments, the random number is generated by applying a hash function to input data to be processed in the task.

In some example embodiments, the expected execution plan further indicates distribution of the plurality of functions across the at least one trusted execution environment. In some example embodiments, generating the validation information comprises: in response to the first number indicating at least one predecessor function for the given function, determining, based on the execution plan, whether the at least one predecessor function and the given function are executed in a same trusted execution environment as that of the given function; and generating the validation information based on the first number and a result of the determining.

In some example embodiments, generating the validation information based on the first number and the result of the determining comprises: in response to the first number indicating one predecessor function and in response to determining that the predecessor function and the given function are executed in the same trusted execution environment, generating the validation information by concatenating the intermediate key for the predecessor function and the identification information of the given function; and in response to the first number indicating one predecessor function and in response to determining that the predecessor function and the given function are executed in different trusted execution environments, determining the validation information by: applying a hash function to a result of execution of the predecessor function that is obtained in the trusted execution environment where the given function is executed, to obtain a hashed result, converting the intermediate key for the predecessor function based on the hashed result, and concatenating the converted intermediate key and the identification information of the given function.

In some example embodiments, converting the intermediate key for the predecessor function based on the hashed result comprises: performing an XOR operation between the intermediate key for the predecessor function and the hashed result.

In some example embodiments, generating the validation information based on the first number and the result of the determining comprises: in response to the first number indicating a plurality of predecessor functions and in response to determining that the plurality of predecessor functions are executed in a same trusted execution environment as that of the given function, generating the validation information by: combining the intermediate keys for the plurality of predecessor functions to obtain a combined intermediate key, and concatenating the combined intermediate key and the identification information of the given function.

In some example embodiments, generating the validation information based on the first number and the result of the determining comprises: in response to the first number indicating a plurality of predecessor functions and in response to determining that the plurality of predecessor functions are executed in a different trusted execution environment than that of the given function, generating the validation information by: for a given predecessor function of the plurality of predecessor functions, applying a hash function to a result of execution of the predecessor function that is obtained in the trusted execution environment where the given function is executed, to obtain a hashed result, converting the intermediate key for the given predecessor function based on the hashed result, and combining the converted intermediate keys for the plurality of predecessor functions to obtain a combined intermediate key, and concatenating the combined intermediate key and the identification information of the given function.

In some example embodiments, generating the validation information based on the first number and the result of the determining comprises: in response to the first number indicating a plurality of predecessor functions and in response to determining that at least one first of the plurality of predecessor functions and the given node are executed in the same trusted execution environment and at least one second predecessor function of the plurality of predecessor functions is executed in a different trusted execution environment than that of the given function, determining the validation information by: converting the intermediate key for the at least one second predecessor function based on a result of execution of the at least one second predecessor function that is obtained in the trusted execution environment where the given function is executed, combining the intermediate key for the at least one first predecessor function and the converted intermediate key, to obtain a combined intermediate key, and concatenating the combined intermediate key and the identification information of the given function.

In some example embodiments, converting the intermediate key for the at least one second predecessor function comprises: applying a hash function to the result of execution of the at least one second predecessor function to obtain a hashed result; and performing an XOR operation between the intermediate key for the at least one second predecessor function and the hashed result, to obtain the converted intermediate key.

In some example embodiments, generating the intermediate key for the given function based on the second number and the validation information comprises: in response to the second number indicating zero successor function, generating the intermediate key for the given function by applying a hash function to the validation information.

In some example embodiments, generating the intermediate key for the given function based on the second number and the validation information comprises: in response to the second number indicating at least one successor function, determining, based on the execution plan, determining whether the at least one successor function is executed in a different trusted execution environment than that of the given function; in response to determining that the at least one successor function is executed in a different trusted execution environment than that of the given function, determining the intermediate key for the given function based on the validation information and a result of execution of the given function; and in response to determining that the at least one successor function is executed in a same trusted execution environment as that of the given function, determining the validation information as the intermediate key for the given function.

In some example embodiments, determining the intermediate key for the given function based on the validation information and a result of execution of the given function comprises: applying a first hash function to the validation information to obtain hashed information; applying a second hash function to the result of execution of the given function; and determining the intermediate key by performing an XOR operation between the hashed information and the hashed result.

Example Apparatus and Device

In some example embodiments, a first apparatus capable of performing any of the method 700 (for example, the first apparatus 110 or the part of the first apparatus 110) may comprise means for performing the respective steps of the method 700. The means may be implemented in any suitable form. For example, the means may be implemented in a circuitry or software module.

In some example embodiments, the first apparatus comprises means for transmitting, to a second apparatus, a request for execution of a task, the task comprising a plurality of functions to be executed; means for generating a first validation key from identification information of the plurality of functions based on an expected execution plan in at least one trusted execution environment of the second apparatus; means for receiving, from the second apparatus, an execution result for the task and a second validation key; and means for determining correctness of the execution result by comparing the first validation key with the second validation key.

In some example embodiments, the expected execution plan at least indicates an execution order of the plurality of functions. In some example embodiments, means for generating the first validation key comprises means for generating intermediate keys for the plurality of functions in the execution order, an intermediate key for a function being determined at least based on an intermediate key for a predecessor function of the function in the execution order; and means for determining the first validation key based on the generated intermediate key for a last function of the plurality of functions.

In some example embodiments, means for generating the intermediate keys comprises: means for, for a given function of the plurality of functions, determining a first number of predecessor functions for the given function and a second number of successor functions for the given function in the execution order; means for generating validation information for the given function based on the first number; and means for generating the intermediate key for the given function based on the second number and the validation information.

In some example embodiments, means for generating the validation information comprises means for, in response to the first number indicating one predecessor function, generating the validation information by concatenating the intermediate key for the one predecessor function and the identification information of the given function.

In some example embodiments, means for generating the validation information comprises means for, in response to the first number indicating a plurality of predecessor functions, generating the validation information for the given function by: combining the intermediate keys for the plurality of predecessor functions to obtain a combined intermediate key, and concatenating the combined intermediate key and the identification information of the given function.

In some example embodiments, means for generating the validation information comprises means for, in response to the first number indicating zero predecessor function, generating the validation information by concatenating a random number and the identification information of the given function, the random number being also used for generation of the second validation key.

In some example embodiments, the first apparatus further includes means for generating the random number by applying a hash function to input data to be processed in the task.

In some example embodiments, means for generating the intermediate key based on the second number and the validation information comprises means for, in response to the second number indicating zero successor function, generating the intermediate key for the given function by applying a hash function to the validation information.

In some example embodiments, the expected execution plan further indicates distribution of the plurality of functions across the at least one trusted execution environment. In some example embodiments, means for generating the intermediate key for the given function based on the second number and the validation information comprises: means for, in response to the second number indicating at least one successor function, determining, based on the expected execution plan, whether the at least one successor function is executed in a different trusted execution environment than that of the given function; means for, in response to determining that the at least one successor function is executed in a different trusted execution environment than that of the given function, generating the intermediate key for the given function by applying a hash function to the validation information; and in response to determining that the at least one successor function is executed in a same trusted execution environment as that of the given function, determining the validation information as the intermediate key for the given function.

In some example embodiments, means for determining the correctness of the execution result comprises means for, in response to the second validation key being the same as the first validation key, determining that the execution result is correct; and in response to the second validation key being different from the first validation key, determining that the execution result is incorrect.

In some example embodiments, the first apparatus further comprises means for performing other steps in some example embodiments of the method 700. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the method 800 (for example, the second apparatus 120 or the part of the second apparatus 120) may comprise means for performing the respective steps of the method 800. The means may be implemented in any suitable form. For example, the means may be implemented in a circuitry or software module.

In some example embodiments, the second apparatus comprises means for receiving, from a first apparatus, a request for execution of a task, the task comprising a plurality of functions to be executed; means for executing, based on an execution plan, the plurality of functions in at least one trusted execution environment to obtain an execution result for the task; means for generating a second validation key from identification information of the plurality of functions based on the execution plan; and means for transmitting, to the first apparatus, the execution result and the second validation key for validating correctness of the execution result.

In some example embodiments, the execution plan at least indicates an execution order of the plurality of functions. In some example embodiments, means for generating the second validation key comprises: means for generating intermediate keys for the plurality of functions in the execution order, an intermediate key for a function being determined at least based on an intermediate key for a predecessor function of the function in the execution order; and determining the second validation key based on the generated intermediate key for a last function of the plurality of functions.

In some example embodiments, means for generating the intermediate keys for the plurality of functions comprises: means for generating the intermediate keys for the plurality of functions within the in at least one trusted execution environment.

In some example embodiments, means for generating the intermediate keys comprises: means for, for a given function of the plurality of functions, determining a first number of predecessor functions for the given function and a second number of successor functions for the given function in the execution order; generating validation information for the given function based on the first number of predecessor functions; and generating the intermediate key for the given function based on the second number and the validation information.

In some example embodiments, means for generating the validation information comprises: means for, in response to the first number indicating zero predecessor function, generating the validation information by concatenating a random number and the identification information of the given function, the random number being also used by the first apparatus for generation of a first validation key.

In some example embodiments, the random number is generated by applying a hash function to input data to be processed in the task.

In some example embodiments, the expected execution plan further indicates distribution of the plurality of functions across the at least one trusted execution environment. In some example embodiments, means for generating the validation information comprises: means for, in response to the first number indicating at least one predecessor function for the given function, determining, based on the execution plan, whether the at least one predecessor function and the given function are executed in a same trusted execution environment as that of the given function; and means for generating the validation information based on the first number and a result of the determining.

In some example embodiments, means for generating the validation information based on the first number and the result of the determining comprises: means for, in response to the first number indicating one predecessor function and in response to determining that the predecessor function and the given function are executed in the same trusted execution environment, generating the validation information by concatenating the intermediate key for the predecessor function and the identification information of the given function; and means for, in response to the first number indicating one predecessor function and in response to determining that the predecessor function and the given function are executed in different trusted execution environments, determining the validation information by: applying a hash function to a result of execution of the predecessor function that is obtained in the trusted execution environment where the given function is executed, to obtain a hashed result, converting the intermediate key for the predecessor function based on the hashed result, and concatenating the converted intermediate key and the identification information of the given function.

In some example embodiments, means for converting the intermediate key for the predecessor function based on the hashed result comprises: means for performing an XOR operation between the intermediate key for the predecessor function and the hashed result.

In some example embodiments, means for generating the validation information based on the first number and the result of the determining comprises: means for, in response to the first number indicating a plurality of predecessor functions and in response to determining that the plurality of predecessor functions are executed in a same trusted execution environment as that of the given function, generating the validation information by: combining the intermediate keys for the plurality of predecessor functions to obtain a combined intermediate key, and concatenating the combined intermediate key and the identification information of the given function.

In some example embodiments, means for generating the validation information based on the first number and the result of the determining comprises: means for, in response to the first number indicating a plurality of predecessor functions and in response to determining that the plurality of predecessor functions are executed in a different trusted execution environment than that of the given function, generating the validation information by: for a given predecessor function of the plurality of predecessor functions, applying a hash function to a result of execution of the predecessor function that is obtained in the trusted execution environment where the given function is executed, to obtain a hashed result, converting the intermediate key for the given predecessor function based on the hashed result, and combining the converted intermediate keys for the plurality of predecessor functions to obtain a combined intermediate key, and concatenating the combined intermediate key and the identification information of the given function.

In some example embodiments, means for generating the validation information based on the first number and the result of the determining comprises: means for, in response to the first number indicating a plurality of predecessor functions and in response to determining that at least one first of the plurality of predecessor functions and the given node are executed in the same trusted execution environment and at least one second predecessor function of the plurality of predecessor functions is executed in a different trusted execution environment than that of the given function, determining the validation information by: converting the intermediate key for the at least one second predecessor function based on a result of execution of the at least one second predecessor function that is obtained in the trusted execution environment where the given function is executed, combining the intermediate key for the at least one first predecessor function and the converted intermediate key, to obtain a combined intermediate key, and concatenating the combined intermediate key and the identification information of the given function.

In some example embodiments, means for converting the intermediate key for the at least one second predecessor function comprises: means for applying a hash function to the result of execution of the at least one second predecessor function to obtain a hashed result; and means for performing an XOR operation between the intermediate key for the at least one second predecessor function and the hashed result, to obtain the converted intermediate key.

In some example embodiments, means for generating the intermediate key for the given function based on the second number and the validation information comprises: means for, in response to the second number indicating zero successor function, generating the intermediate key for the given function by applying a hash function to the validation information.

In some example embodiments, means for generating the intermediate key for the given function based on the second number and the validation information comprises: means for, in response to the second number indicating at least one successor function, determining, based on the execution plan, determining whether the at least one successor function is executed in a different trusted execution environment than that of the given function; means for, in response to determining that the at least one successor function is executed in a different trusted execution environment than that of the given function, determining the intermediate key for the given function based on the validation information and a result of execution of the given function; and means for, in response to determining that the at least one successor function is executed in a same trusted execution environment as that of the given function, determining the validation information as the intermediate key for the given function.

In some example embodiments, means for determining the intermediate key for the given function based on the validation information and a result of execution of the given function comprises: means for applying a first hash function to the validation information to obtain hashed information; means for applying a second hash function to the result of execution of the given function; and means for determining the intermediate key by performing an XOR operation between the hashed information and the hashed result.

In some example embodiments, the second apparatus further comprises means for performing other steps in some example embodiments of the method 800. In some example embodiments, the means comprises at least one processor; and at least one memory including computer program code, the at least one memory and computer program code configured to, with the at least one processor, cause the performance of the second apparatus.

Figure 9:
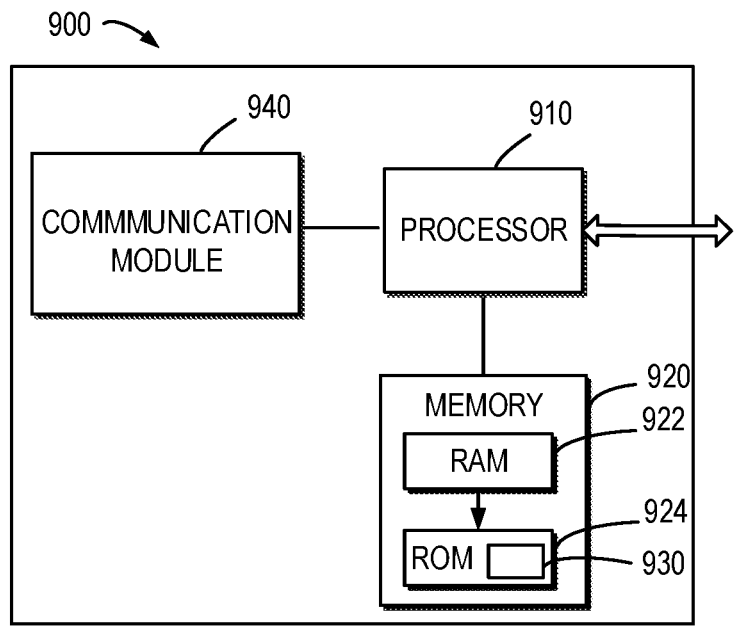
FIG. 9 illustrates a simplified block diagram of a device that is suitable for implementing example embodiments of the present disclosure.

FIG. 9 is a simplified block diagram of a device 900 that is suitable for implementing example embodiments of the present disclosure. The device 900 may be provided to implement a computing device, for example the first apparatus 110 or the second apparatus 120 as shown in FIG. 1, or a part of the first apparatus 110 or the second apparatus 120. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIGS. 2 to 8. The example embodiments of the present disclosure may also be implemented by hardware or by a combination of software and hardware.

Figure 10:
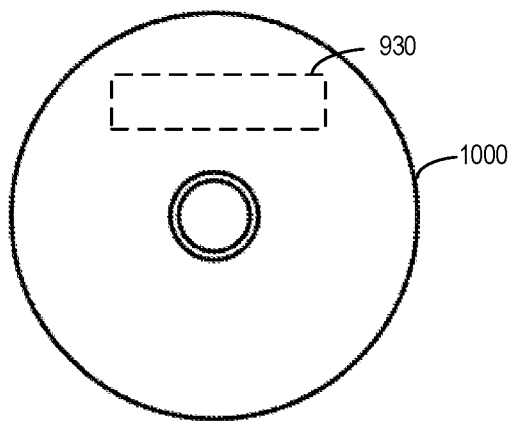
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of a computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to FIGS. 2 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
at least one processor; and
at least one memory including computer program code;
wherein the at least one memory and the computer program code are configured to, with the at least one processor, cause the first apparatus to:
transmit, to a second apparatus, a request for execution of a task, the task comprising a plurality of functions to be executed;
generate a first validation key from identification information of the plurality of functions based on an expected execution plan in at least one trusted execution environment of the second apparatus;
receive, from the second apparatus, an execution result for the task and a second validation key; and
determine correctness of the execution result by comparing the first validation key with the second validation key,
wherein the expected execution plan at least indicates an execution order of the plurality of functions, and wherein the at least one memory and the computer program code are configured to, with the at least one processor, cause the first apparatus to generate the first validation key by:
generating intermediate keys for the plurality of functions in the execution order, an intermediate key for a function being determined at least based on an intermediate key for a predecessor function of the function in the execution order; and
determining the first validation key based on the generated intermediate key for a last function of the plurality of functions.

2. The apparatus of claim 1, wherein the at least one memory and the computer program code are configured to, with the at least one processor, cause the first apparatus to generate the intermediate keys by: for a given function of the plurality of functions,
determining a first number of predecessor functions for the given function and a second number of successor functions for the given function in the execution order;
generating validation information for the given function based on the first number; and
generating the intermediate key for the given function based on the second number and the validation information.

3. The apparatus of claim 2, wherein the at least one memory and the computer program code are configured to, with the at least one processor, cause the first apparatus to generate the validation information by:
in response to the first number indicating one predecessor function, generating the validation information by concatenating the intermediate key for the one predecessor function and the identification information of the given function.

4. The apparatus of claim 2, wherein the at least one memory and the computer program code are configured to, with the at least one processor, cause the first apparatus to generate the validation information by:
in response to the first number indicating a plurality of predecessor functions, generating the validation information for the given function by:
combining the intermediate keys for the plurality of predecessor functions to obtain a combined intermediate key, and
concatenating the combined intermediate key and the identification information of the given function.

5. The apparatus of claim 2, wherein the at least one memory and the computer program code are configured to, with the at least one processor, cause the first apparatus to generate the validation information by:
in response to the first number indicating zero predecessor function, generating the validation information by concatenating a random number and the identification information of the given function, the random number being also used for generation of the second validation key.

6. The apparatus of claim 5, wherein the at least one memory and the computer program code are configured to, with the at least one processor, further cause the first apparatus to:
  generate the random number by applying a hash function to input data to be processed in the task.

7. The apparatus of claim 2, wherein the at least one memory and the computer program code are configured to, with the at least one processor, cause the first apparatus to generate the intermediate key based on the second number and the validation information by:
  in response to the second number indicating zero successor function, generating the intermediate key for the given function by applying a hash function to the validation information.

8. The apparatus of claim 2, wherein the expected execution plan further indicates distribution of the plurality of functions across the at least one trusted execution environment, and
  wherein the at least one memory and the computer program code are configured to, with the at least one processor, cause the first apparatus to generate the intermediate key for the given function based on the second number and the validation information by:
    in response to the second number indicating at least one successor function, determining, based on the expected execution plan, whether the at least one successor function is executed in a different trusted execution environment than that of the given function;
    in response to determining that the at least one successor function is executed in a different trusted execution environment than that of the given function, generating the intermediate key for the given function by applying a hash function to the validation information; and
    in response to determining that the at least one successor function is executed in a same trusted execution environment as that of the given function, determining the validation information as the intermediate key for the given function.

9. The apparatus of claim 1, wherein the at least one memory and the computer program code are configured to, with the at least one processor, cause the first apparatus to determine the correctness of the execution result by:
  in response to the second validation key being the same as the first validation key, determining that the execution result is correct; and
  in response to the second validation key being different from the first validation key, determining that the execution result is incorrect.

10. A second apparatus, comprising:
  at least one processor; and
  at least one memory including computer program code;
  wherein the at least one memory and the computer program code are configured to, with the at least one processor, cause the second apparatus to:
    receive, from a first apparatus, a request for execution of a task, the task comprising a plurality of functions to be executed;
    execute, based on an execution plan, the plurality of functions in at least one trusted execution environment to obtain an execution result for the task;
    generate a second validation key from identification information of the plurality of functions based on the execution plan; and
    transmit, to the first apparatus, the execution result and the second validation key for validating correctness of the execution result,
  wherein the execution plan at least indicates an execution order of the plurality of functions, and wherein the at least one memory and the computer program code are configured to, with the at least one processor, cause the second apparatus to generate the second validation key by:
    generating intermediate keys for the plurality of functions in the execution order, an intermediate key for a function being determined at least based on an intermediate key for a predecessor function of the function in the execution order; and
    determining the second validation key based on the generated intermediate key for a last function of the plurality of functions.

11. The apparatus of claim 10, wherein the at least one memory and the computer program code are configured to, with the at least one processor, cause the second apparatus to generate the intermediate keys for the plurality of functions by:
  generating the intermediate keys for the plurality of functions within the at least one trusted execution environment.

12. The apparatus of claim 10, wherein the at least one memory and the computer program code are configured to, with the at least one processor, cause the second apparatus to generate the intermediate keys by: for a given function of the plurality of functions,
  determining a first number of predecessor functions for the given function and a second number of successor functions for the given function in the execution order;
  generating validation information for the given function based on the first number of predecessor functions; and
  generating the intermediate key for the given function based on the second number and the validation information.

13. The apparatus of claim 12, wherein the at least one memory and the computer program code are configured to, with the at least one processor, cause the second apparatus to generate the validation information by:
  in response to the first number indicating zero predecessor function, generating the validation information by concatenating a random number and the identification information of the given function, the random number being also used by the first apparatus for generation of a first validation key.

14. The apparatus of claim 13, wherein the random number is generated by applying a hash function to input data to be processed in the task.

15. The apparatus of claim 13, wherein the expected execution plan further indicates distribution of the plurality of functions across the at least one trusted execution environment, and
  wherein the at least one memory and the computer program code are configured to, with the at least one processor, cause the second apparatus to generate the validation information by:
    in response to the first number indicating at least one predecessor function for the given function, determining, based on the execution plan, whether the at least one predecessor function and the given function are executed in a same trusted execution environment as that of the given function; and
    generating the validation information based on the first number and a result of the determining.

16. The apparatus of claim 15, wherein the at least one memory and the computer program code are configured to, with the at least one processor, cause the second apparatus to generate the validation information based on the first number and the result of the determining by:

in response to the first number indicating one predecessor function and in response to determining that the predecessor function and the given function are executed in the same trusted execution environment, generating the validation information by concatenating the intermediate key for the predecessor function and the identification information of the given function; and in response to the first number indicating one predecessor function and in response to determining that the predecessor function and the given function are executed in different trusted execution environments, determining the validation information by:

applying a hash function to a result of execution of the predecessor function that is obtained in the trusted execution environment where the given function is executed, to obtain a hashed result, converting the intermediate key for the predecessor function based on the hashed result, and concatenating the converted intermediate key and the identification information of the given function.

17. The apparatus of claim 15, wherein the at least one memory and the computer program code are configured to, with the at least one processor, cause the second apparatus to generate the validation information based on the first number and the result of the determining by:

in response to the first number indicating a plurality of predecessor functions and in response to determining that the plurality of predecessor functions are executed in a same trusted execution environment as that of the given function, generating the validation information by the following:

combining the intermediate keys for the plurality of predecessor functions to obtain a combined intermediate key, and concatenating the combined intermediate key and the identification information of the given function.

18. The apparatus of claim 15, wherein the at least one memory and the computer program code are configured to, with the at least one processor, cause the second apparatus to generate the validation information based on the first number and the result of the determining by:

in response to the first number indicating a plurality of predecessor functions and in response to determining that the plurality of predecessor functions are executed in a different trusted execution environment than that of the given function, generating the validation information by:

for a given predecessor function of the plurality of predecessor functions, applying a hash function to a result of execution of the predecessor function that is obtained in the trusted execution environment where the given function is executed, to obtain a hashed result, converting the intermediate key for the given predecessor function based on the hashed result, and combining the converted intermediate keys for the plurality of predecessor functions to obtain a combined intermediate key, and concatenating the combined intermediate key and the identification information of the given function.

\* \* \* \* \*